US009159500B2

(12) United States Patent
Suzuka et al.

(10) Patent No.: US 9,159,500 B2
(45) Date of Patent: Oct. 13, 2015

(54) PHOTOELECTRIC CONVERSION ELEMENT

(71) Applicant: Panasonic Corporation, Osaka (JP)

(72) Inventors: Michio Suzuka, Osaka (JP); Takashi Sekiguchi, Osaka (JP); Naoki Hayashi, Osaka (JP); Hiroyuki Nishide, Tokyo (JP); Kenichi Oyaizu, Tokyo (JP); Fumiaki Kato, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/413,974

(22) PCT Filed: Mar. 13, 2014

(86) PCT No.: PCT/JP2014/001425
§ 371 (c)(1),
(2) Date: Jan. 9, 2015

(87) PCT Pub. No.: WO2014/148016
PCT Pub. Date: Sep. 25, 2014

(65) Prior Publication Data
US 2015/0179353 A1    Jun. 25, 2015

(30) Foreign Application Priority Data

Mar. 22, 2013  (JP) .................................. 2013-059713
Nov. 8, 2013   (JP) .................................. 2013-231968

(51) Int. Cl.
*H01G 9/20*      (2006.01)
*H01M 14/00*     (2006.01)

(52) U.S. Cl.
CPC ........... *H01G 9/2059* (2013.01); *H01G 9/2009* (2013.01); *H01G 9/2031* (2013.01); *H01M 14/00* (2013.01); *Y02E 10/542* (2013.01)

(58) Field of Classification Search
CPC . H01G 9/2031; H01G 9/2059; H01G 9/2009; Y02E 10/542; H01M 14/00
USPC .......................................................... 136/263
See application file for complete search history.

(56) References Cited

U.S. PATENT DOCUMENTS 5,060,040 A * 10/1991 Saika et al. ..................... 257/53
5,061,979 A * 10/1991 Kobayashi et al. ........... 136/244

(Continued)

FOREIGN PATENT DOCUMENTS

EP    0 718 288 A1    6/1996
JP    63-019775 A     1/1988

(Continued)

OTHER PUBLICATIONS

International Search Report for corresponding International Application No. PCT/JP2014/001425 mailed Apr. 8, 2014.

(Continued)

*Primary Examiner* — Golam Mowla
(74) *Attorney, Agent, or Firm* — Renner, Otto, Boisselle & Sklar, LLP

(57) ABSTRACT

A photoelectric conversion element (100) according to the present disclosure includes: a photoanode (15); a counter electrode (32); a solid compound layer (22) disposed between the photoanode (15) and the counter electrode (32); a charge storage electrode (55) disposed at an interspace from the counter electrode (32); and an electrolyte medium (24) being contained in the solid compound layer (22) and filling the interspace.

10 Claims, 7 Drawing Sheets

(56) References Cited

U.S. PATENT DOCUMENTS

| | | | |
|---|---|---|---|
| 5,683,832 A | 11/1997 | Bonhote et al. | |
| 5,728,487 A | 3/1998 | Gratzel et al. | |
| 6,541,697 B1 * | 4/2003 | Georg et al. | 136/263 |
| 7,773,386 B2 * | 8/2010 | Yamashita et al. | 361/749 |
| 2003/0082437 A1 | 5/2003 | Sotomura | |
| 2005/0221169 A1 | 10/2005 | Sotomura | |
| 2006/0191567 A1 * | 8/2006 | Mitsui | 136/256 |
| 2006/0219289 A1 * | 10/2006 | Skryabin et al. | 136/244 |
| 2006/0268493 A1 * | 11/2006 | Miyasaka et al. | 361/502 |
| 2008/0057355 A1 | 3/2008 | Ajiki | |
| 2009/0078307 A1 | 3/2009 | Segawa et al. | |
| 2012/0119193 A1 | 5/2012 | Sekiguchi et al. | |
| 2012/0187387 A1 | 7/2012 | Sekiguchi et al. | |
| 2013/0000703 A1 * | 1/2013 | Lee et al. | 136/252 |

FOREIGN PATENT DOCUMENTS

| | | |
|---|---|---|
| JP | 2005/056856 A | 3/2005 |
| JP | 2006/172758 A | 6/2006 |
| JP | 2009-071147 A | 4/2009 |
| JP | 2009-081046 A | 4/2009 |
| JP | 2011-034813 A | 2/2011 |
| JP | 2012-190665 A | 10/2012 |
| JP | 2013-201044 A | 10/2013 |
| JP | 2013-201071 A | 10/2013 |
| WO | WO 95/18456 A1 | 7/1995 |
| WO | WO 2011/013760 A1 | 2/2011 |
| WO | WO 2011/144306 A1 | 11/2011 |

OTHER PUBLICATIONS

Form PCT/ISA/237 for corresponding International Application No. PCT/JP2014/001425 dated Apr. 8, 2014 and partial English translation.

"FPD • DSSC • Hikari Memori to Kinouseishikiso no Saishingijutsu to Zairyokaihatsu (or, Latest Technologies and Material Development in FPD/DSSC/Optical Memories and Functional Dyes)" (NTS, Inc.), pp. 28-50 and concise explanation.

Electrochemistry, vol. 65, No. 11, p. 923 (1997).

Papgeorgiou et al., "The Peformance and Stability of Ambient Temperature Molten Salts for Solar Cell Applications", J. Electrochem. Soc., vol. 143, No. 10, p. 3099 (1996).

Bonhôte et al., "Hydrophobic, Highly Conductive Ambient-Temperature Molten Salts", Inorg. Chem., vol. 35, p. 1168 (1996).

Extended European Search Report for corresponding European Application No. 14767296.8 dated May 8, 2015.

Liu P. et al., "A solar rechargeable battery based on polymeric charge storage electrodes", Electrochemistry Communications, vol. 16, No. 1, Dec. 20, 2011, pp. 69-72, XP028890567.

* cited by examiner

FIG.1
(a)
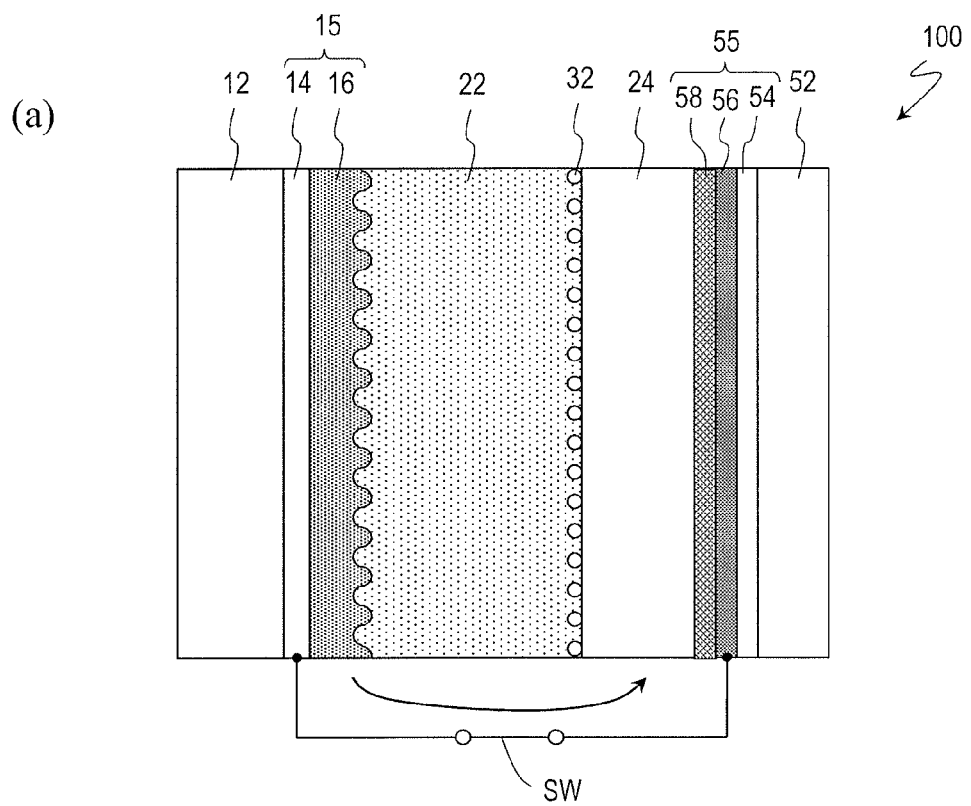
(b)
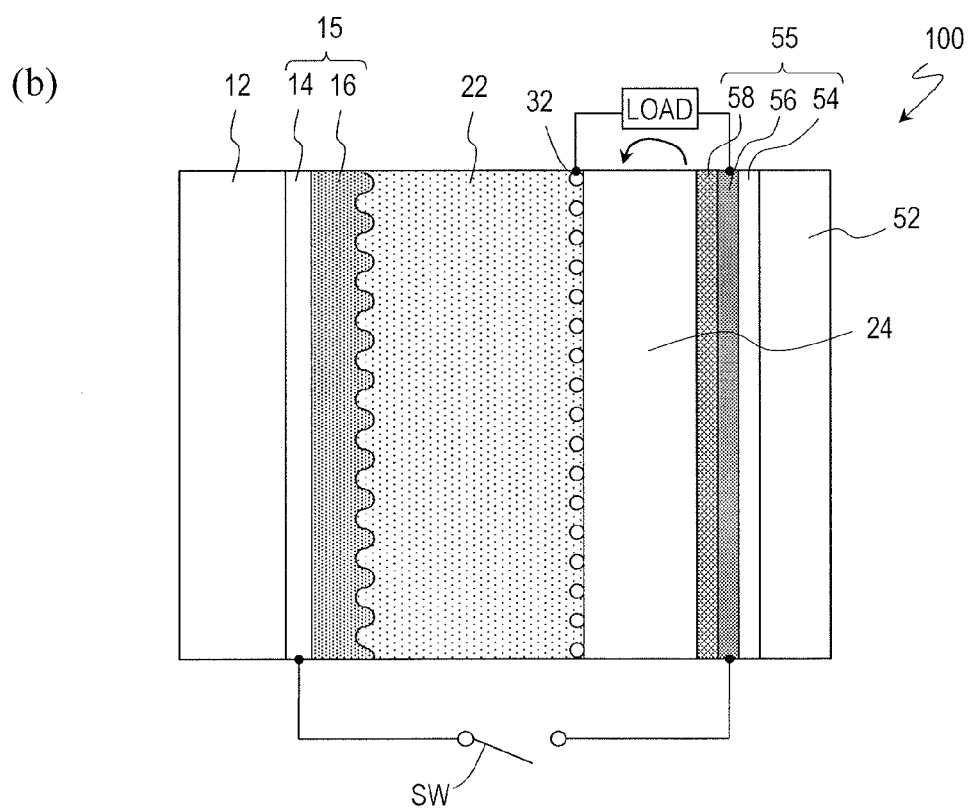

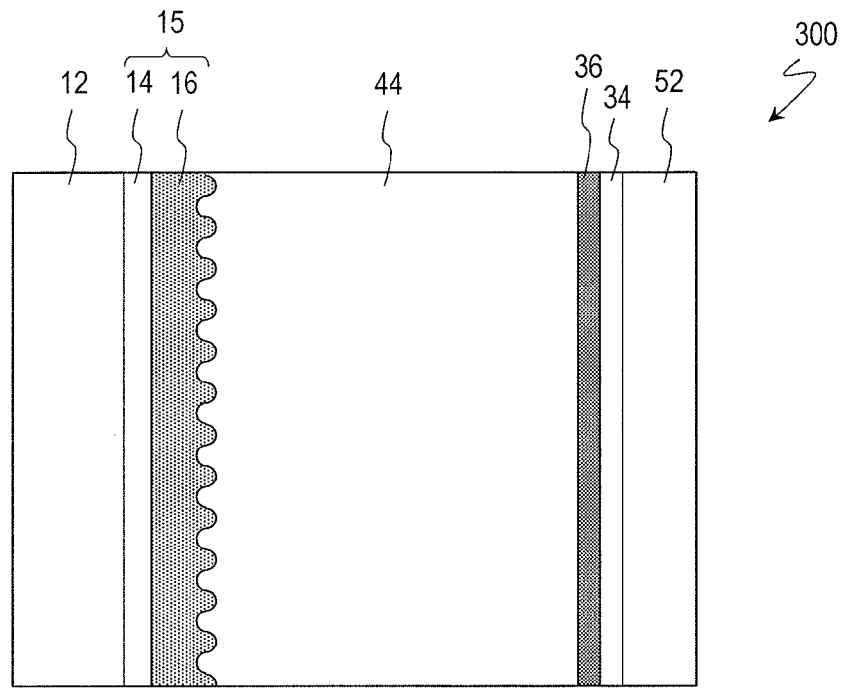
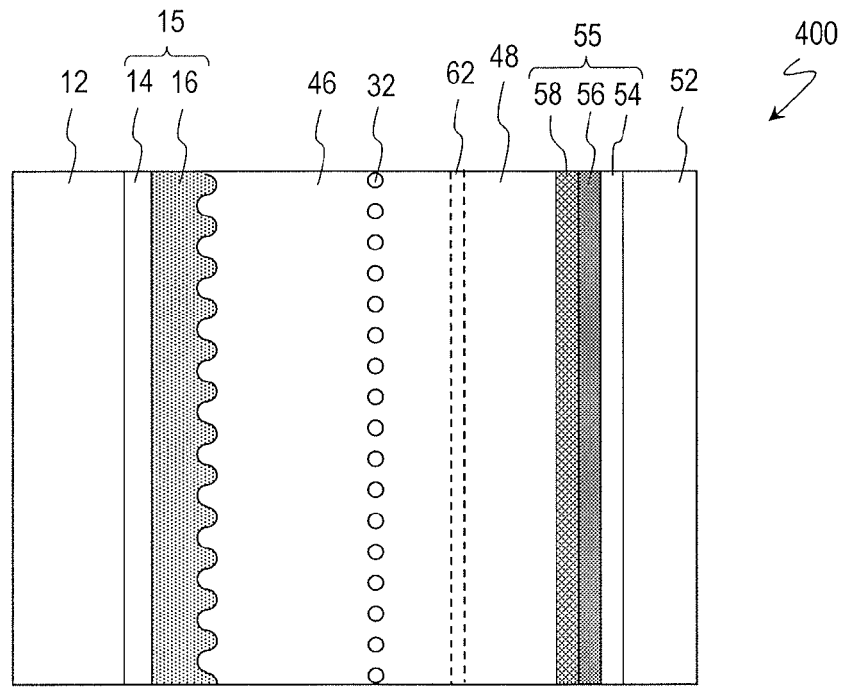

(a)

(b)

PHOTOELECTRIC CONVERSION ELEMENT

TECHNICAL FIELD

The present disclosure relates to photoelectric conversion elements, and more particularly to photosensitized photoelectric conversion elements. Herein, photosensitized photoelectric conversion elements encompass so-called dye-sensitized photovoltaic cells, and further include dye-sensitized type electric generators which are capable of generating electric power in environments with relatively low illuminance, e.g., indoors.

BACKGROUND ART

In recent years, research and development of dye-sensitized photovoltaic cells, in which a dye is used as a photosensitizing agent, is under way. A conventional dye-sensitized photovoltaic cell typically includes a photoanode containing a dye, a counter electrode, an electron transport layer and a hole transport layer provided between the photoanode and the counter electrode, and an electrolyte solution containing a redox pair. In order to improve the characteristics of a dye-sensitized photovoltaic cell, improvements in the characteristics of the respective component elements are needed.

Patent Document 1 discloses a photoelectric conversion element whose hole transport characteristics are improved by using as a hole transport layer a gel layer which contains an organic compound including an oxidation-reduction site. In the photoelectric conversion element of Patent Document 1, a gel layer containing an organic compound is also used as an electron transport layer.

Patent Document 2 discloses an energy-storable dye-sensitized photovoltaic cell having an electrical storage function. The energy-storable dye-sensitized photovoltaic cell described in Patent Document 2 includes a cell portion in which a photoelectrode and a counter electrode are disposed within a first electrolyte solution, and a battery portion which is partitioned from this cell portion by a cation exchange membrane and in which a charge storage electrode is disposed within a second electrolyte solution. The second electrolyte solution has the same cation species as that of the first electrolyte solution and a different anion species from that of the first electrolyte solution. The first electrolyte solution contains an oxidation-reduction substance ($I^-/I3^-$), and the cation exchange membrane is provided in order to prevent the oxidation-reduction substance from moving into the second electrolyte solution.

CITATION LIST

Patent Literature

[Patent Document 1] International Publication No. 2011/013760
[Patent Document 2] Japanese Laid-Open Patent Publication No. 2006-172758

SUMMARY OF INVENTION

Technical Problem

However, according to a study by the inventors, the energy-storable dye-sensitized photovoltaic cell described in Patent Document 2 suffers from a low discharge rate. This is due to the fact that the cation exchange membrane which provides partitioning between the cell portion and the battery portion impedes movement of ions between the first electrolyte solution and the second electrolyte solution.

Accordingly, the present disclosure provides a photoelectric conversion element having an electrical storage function, with a discharge rate which is improved over that of the energy-storable dye-sensitized photovoltaic cell described in Patent Document 2.

Solution to Problem

A photoelectric conversion element according to an embodiment of the present disclosure comprises: a photoanode; a counter electrode; a solid compound layer disposed between the photoanode and the counter electrode; a charge storage electrode disposed at an interspace from the counter electrode; and an electrolyte medium being contained in the solid compound layer and filling the interspace.

Advantageous Effects of Invention

A photoelectric conversion element according to an embodiment of the present disclosure has an electrical storage function, and is able to perform discharge at a rate which is higher than conventional.

BRIEF DESCRIPTION OF DRAWINGS

FIGS. 1 (a) and (b) are diagrams schematically showing the structure of a photoelectric conversion element 100 according to an embodiment of the present disclosure, where (a) illustrates a charging state and (b) illustrates a discharging state.

FIG. 2 A diagram schematically showing the structure of a photoelectric conversion element 300 of Comparative Example 1.

FIG. 3 A diagram schematically showing the structure of a photoelectric conversion element 400 of Comparative Example 2.

DESCRIPTION OF EMBODIMENTS

Figure 4:
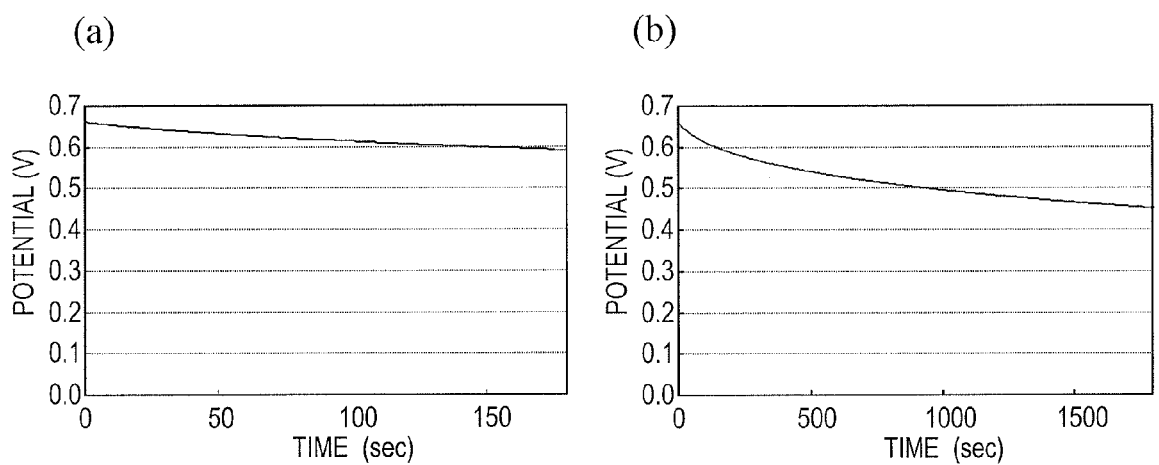
FIG. 4 A graph showing results of measuring voltage changes over time, when transitioning from a light-irradiated state to a dark state, with respect to a photoelectric conversion element of Example 1.

The present disclosure encompasses photoelectric conversion elements as described in the following items.

[Item 1]

A photoelectric conversion element comprising: a photoanode; a counter electrode; a solid compound layer disposed between the photoanode and the counter electrode; a charge storage electrode disposed at an interspace from the counter electrode; and an electrolyte medium being contained in the solid compound layer and filling the interspace.

[Item 2]

The photoelectric conversion element of item 1, wherein the electrolyte medium is an electrolyte solution, and an oxidation-reduction substance contained in the electrolyte solution is 10 mM at the most.

[Item 3]

The photoelectric conversion element of item 1 or 2, wherein the solid compound layer is in direct contact with the photoanode and the counter electrode.

[Item 4]

The photoelectric conversion element of any of items 1 and 3, wherein the solid compound layer includes a polymer gel layer containing a polymer having an oxidation-reduction site.

[Item 5]

The photoelectric conversion element of item 4, wherein the polymer contains substantially no molecules with a molecular weight of less than 1000.

[Item 6]

The photoelectric conversion element of item 4 or 5, wherein the polymer has a cross-linked structure.

[Item 7]

The photoelectric conversion element of any of items 4 to 6, wherein the polymer gel layer further contains a conductivity aid.

[Item 8]

The photoelectric conversion element of any of items 4 to 7, wherein the oxidation-reduction site includes a stable radical.

[Item 9]

The photoelectric conversion element of any of items 1 to 8, wherein the photoanode further includes a conductive layer which transmits visible light and a semiconductor layer formed on the conductive layer, the semiconductor layer containing a photosensitizing agent.

[Item 10]

The photoelectric conversion element of item 9, wherein the semiconductor layer contains porous titanium oxide.

[Item 11]

A photoelectric conversion element comprising:

a first substrate;

a second substrate disposed so as to create an interspace between itself and the first substrate;

an electrolyte medium filling the interspace and containing an electrolyte solution;

a sealing portion formed between the first substrate and the second substrate, with which to hermetically contain the electrolyte medium in the interspace;

first, second, and third electrodes being in contact with the electrolyte medium and each having an electrochemically distinct function; and a solid compound layer disposed between the first electrode and the second electrode, the solid compound layer containing the electrolyte medium, wherein at least a portion of each of the first, second, and third electrodes is formed on the first substrate or the second substrate.

[Item 12]

The photoelectric conversion element of item 11, wherein at least a portion of each of two electrodes among the first, second, and third electrodes is formed on the first substrate, and at least a portion of the other electrode among the first, second, and third electrodes is formed on the second substrate.

[Item 13]

The photoelectric conversion element of item 11 or 12, wherein the first electrode includes a first conductive layer and a semiconductor layer formed on the first conductive layer, the semiconductor layer being formed in such a manner that the first conductive layer is not in direct contact with the electrolyte medium.

[Item 14]

The photoelectric conversion element of item 13, wherein the first electrode is formed on the first substrate, and when viewed from a normal direction of the first substrate, there is a region on the first substrate where no first conductive layer exists but only the semiconductor layer exists.

[Item 15]

The photoelectric conversion element of item 13 or 14, wherein the first electrode is a photoanode, the second electrode is a counter electrode, and the third electrode is a charge storage electrode.

[Item 16]

The photoelectric conversion element of item 15, wherein, the first electrode is formed on the first substrate; and the second electrode and the third electrode are formed on the second substrate.

[Item 17]

The photoelectric conversion element of item 15, wherein, the first electrode and at least a portion of the second electrode are formed on the first substrate; and the third electrode is formed on the second substrate.

[Item 18]

The photoelectric conversion element of any of items 11 to 17, further comprising a separator between the solid compound layer and the third electrode.

[Item 19]

The photoelectric conversion element of any of items 11 to 18, wherein the semiconductor layer includes a non-porous semiconductor layer formed on the conductive layer side, a porous semiconductor layer formed on the non-porous semiconductor layer, the porous semiconductor layer containing a sensitizing dye.

Embodiments

Hereinafter, with reference to the drawings, embodiments of the present disclosure will be described.

FIGS. 1(a) and (b) schematically show the structure of a photoelectric conversion element 100 according to an embodiment. FIG. 1(a) shows a charging state, whereas FIG. 1(b) shows a discharging state. In FIGS. 1(a) and (b), flow of electrons is indicated by an arrow.

The photoelectric conversion element 100 includes a photoanode 15, a counter electrode 32, a solid compound layer disposed between the photoanode 15 and the counter electrode 32, a charge storage electrode 55 disposed at an interspace from the counter electrode 32, and an electrolyte medium 24 being contained in the solid compound layer 22 and filling the interspace between the counter electrode 32 and the charge storage electrode 55. The electrolyte medium 24 is typically an electrolyte solution, and hereinafter may be referred to as the electrolyte solution 24. The photoelectric conversion element 100 constitutes a photoelectric generator between the photoanode 15 and the counter electrode 32, and constitutes a storage cell between the counter electrode 32 and the charge storage electrode 55. When the photoanode 15 includes a semiconductor layer that contains a photosensitizing agent, as is illustrated herein, a dye-sensitized photovoltaic cell is constituted between the photoanode 15 and the counter electrode 32, for example.

As shown in FIG. 1(a), in a charging state, the photoanode 15 and the charge storage electrode 55 are electrically connected via a switch SW, for example. On the other hand, in a discharging state, as shown in FIG. 1(b), a load is connected to the counter electrode 32 and the charge storage electrode 55. Herein, as shown in the figure, the photoanode 15 and the charge storage electrode 55 may be electrically isolated from each other by the switch SW, for example, or alternatively, the photoanode 15 and the charge storage electrode 55 may always be kept electrically connected. Note that the positioning of the electric generator and the storage cell is not limited to what is illustrated herein, and may be any other positioning that is electrically and electrochemically equivalent.

For example, the photoanode 15 includes a conductive layer that transmits visible light (which may be referred to as the "transparent conductive layer") 14 and a semiconductor layer 16 formed on the conductive layer 14, the semiconductor layer 16 containing a photosensitizing agent. For example, the semiconductor layer 16 contains a porous semiconductor (e.g., porous titanium oxide) and a photosensitizing agent carried on the surface of the porous semiconductor. Although an embodiment of the present disclosure is described herein as mainly concerning a photosensitizing agent which at least absorbs visible light, it will be appreciated that the photosensitizing agent may further absorb light in any other wavelength region (e.g., near-infrared).

The solid compound layer 22 is typically structured so as to internally contain the electrolyte solution 24. The solid compound layer 22 is provided so as to be in direct contact with the photoanode 15 and the counter electrode 32, for example. The solid compound layer 22 transports holes which are generated in the photoanode 15 to the counter electrode 32. The solid compound layer 22 includes, for example, a polymer gel layer which contains a polymer having an oxidation-reduction site (e.g., a stable radical such as nitroxy radical). Alternatively, the solid compound layer 22 contains a porous body or a solid that is capable of intercalation (e.g., lithium cobaltate). In the case where the solid compound layer 22 contains a porous body or a solid that is capable of intercalation, the solid compound layer 22 further contains electrically conductive carbon, for example. The solid compound layer 22 functions as an oxidation-reduction substance, and also functions to immobilize or retain an oxidation-reduction substance. Therefore, using the solid compound layer 22 makes it possible to omit the cation exchange membrane described in Patent Document 2.

Note that the polymer gel layer provides an advantage in that the contact areas with the photoanode 15 and the counter electrode 32 can be increased. Preferably, the polymer contains substantially no molecules with a molecular weight of less than 1000, for example. This restrains the low-molecular weight component having an oxidation-reduction site from eluting into the electrolyte solution 24 and being reduced at the charge storage electrode 55. Moreover, the polymer preferably has a cross-linked structure, where the cross-linked structure preferably has a chemical cross-linked structure. The reason is that a chemical cross-linked structure has a higher stability than does a physical cross-linked structure which is formed through entanglement of polymer chains. Preferably, the polymer gel layer further contains a conductivity aid. A polymer gel having a stable radical as an oxidation-reduction site is electrically conductive in an electrolyte solution; however, the internal resistance can be further decreased by mixing a conductivity aid (e.g., vapor-phase grown carbon fibers).

For example, the counter electrode 32 is an electrode having a plurality of throughholes through which the electrolyte solution 24 can pass (e.g., a meshed platinum electrode).

The electrolyte solution 24 contains a supporting electrolyte and a solvent. The electrolyte solution 24 preferably contains no oxidation-reduction substance, and the oxidation-reduction substance to be contained in the electrolyte solution 24 is 10 mM at the most, for example. Transport of holes preferably only occurs in the solid compound layer 22. The electrolyte solution 24 is in contact with the photoanode 15, the counter electrode 32, and the charge storage electrode 55. The electrolyte solution 24 is hermetically contained between the photoanode 15 and the charge storage electrode 55 by a sealing portion not shown.

For example, the charge storage electrode 55 includes an oxide conductive layer 54 formed on the substrate 52, a metal layer 56 formed on the oxide conductive layer 54, and a charge storage layer 58 formed on the metal layer 56. The charge storage layer 58 may be formed from a mixture of tungsten oxide and electrically conductive carbon, for example. The charge storage layer 58 is in contact with the electrolyte solution 24. The substrate 52 is, for example, a glass substrate or a plastic substrate (including a plastic film) which transmits visible light.

The details of the materials used for forming the aforementioned component elements of the photoelectric conversion element 100 will be described later.

The basic operation of the photoelectric conversion element 100 will be described.

When the photoanode 15 is irradiated with light of a predetermined wavelength range, the photosensitizing agent absorbs visible light and is promoted to an excited state, thus generating electron-hole pairs. The electrons are injected into the conduction band of the semiconductor layer 16, and transported to the conductive layer 14. The holes are led to the counter electrode 32 via the solid compound layer 22, and the photosensitizing agent becomes reduced. Thus, the solid compound layer 22 functions as an oxidation-reduction substance. Stated otherwise, any solid compound functioning as an oxidation-reduction substance is usable as the solid compound layer 22. As shown in FIG. 1(a), in a state where the photoanode 15 and the charge storage electrode 55 are electrically connected, photovoltaic power generation and charging occur in this manner. Since the oxidation-reduction substance is immobilized or retained by the solid compound layer 22, self-discharge is suppressed.

On the other hand, as shown in FIG. 1(b), by connecting a load to the counter electrode 32 and the charge storage electrode 55, the electric charge having been stored can be taken out. At this point, the photoanode 15 and the charge storage electrode 55 may be electrically isolated as shown in the figure, or alternatively, the photoanode 15 and the charge storage electrode 55 may be electrically connected.

Hereinafter, materials used for forming the aforementioned component elements of the photoelectric conversion element 100 will be described in detail.

<Photoanode>

As described above, for example, the photoanode 15 includes the conductive layer 14 transmitting visible light, and the semiconductor layer 16 formed on the conductive layer 14, the semiconductor layer 16 containing a photosensitizing agent. The semiconductor layer 16 containing a photosensitizing agent may also be referred to as a light absorbing layer. In this case, for example, the substrate 12 is a glass substrate or a plastic substrate (including a plastic film) which transmits visible light.

The conductive layer 14 which transmits visible light can be made of a material which transmits visible light (hereinafter referred to as a "transparent electrically conductive material"), for example. As the transparent electrically conductive material, for example, a metal oxide which is electrically conductive can be used. For example, the metal oxide is indium-tin complex oxide, tin oxide doped with antimony, tin oxide doped with fluorine, or a composite thereof. The conductive layer 14 which transmits visible light may also be made of an electrically conductive material which does not transmit light. For example, a metal layer having a linear (stripe) pattern, a wavy line pattern, a grating (mesh) pattern, a perforated metal (as characterized by a multitude of minute throughholes in a regular or irregular array) pattern, or a metal layer having a pattern which is inverted in terms of negative/positive from these can be used. In such metal layers, light can be transmitted through any portion where the metal does not exist. Examples of metals include platinum, gold, silver, copper, aluminum, rhodium, indium, titanium, iron, nickel, tin, zinc, or alloys containing any of these. Furthermore, instead of metals, any carbon material which is electrically conductive may also be used.

The transmittance of the conductive layer 14 which transmits visible light is e.g. 50% more, and preferably 80% more. The wavelength of light to be transmitted depends on the absorption wavelength of the photosensitizing agent. Herein, the thickness of the conductive layer 14 is in the range of 1 nm to 100 nm, for example.

In the case where light is incident on the semiconductor layer 16 at the opposite side from the substrate 12, the substrate 12 and the conductive layer 14 do not need to transmit visible light. Therefore, when the conductive layer 14 is formed by using a metal or carbon as mentioned above, it is not necessary to create any regions that is void of the metal or carbon; furthermore, when these materials have sufficient strength, the conductive layer 14 may double as the substrate 12.

In order to prevent electron leakage at the surface of the conductive layer 14, i.e., in order to confer rectification ability between the conductive layer 14 and the semiconductor layer 16, an oxide layer such as silicon oxide, tin oxide, titanium oxide, zirconium oxide, or aluminum oxide may be formed between the conductive layer 14 and the semiconductor layer 16.

As described above, the semiconductor layer 16 containing a photosensitizing agent includes, for example, a porous semiconductor and a photosensitizing agent carried on the surface of the porous semiconductor. The porous semiconductor is porous titanium oxide ($TiO_2$), for example. Titanium oxide is characterized by its high photoelectric conversion characteristics and by the fact that photodissolution into the electrolyte solution is unlikely to occur. Moreover, porous bodies have a large specific surface area, thereby providing the advantage of being able to carry a large amount of photosensitizing agent and increase the contact area between the subsequently-described solid compound layer 22 and the electrolyte solution 24. Without being limited to porous bodies, a semiconductor layer 16 may be composed of aggregated semiconductor particles, for example.

The thickness of the semiconductor layer 16 is not less than 0.01 μm and not more than 100 μm, for example. Although the thickness of the semiconductor layer 16 may be adapted as appropriate to the efficiency of photoelectric conversion, it is preferably not less than 0.5 μm and not more than 50 μm, and more preferably not less than 1 μm and not more than 20 μm. Moreover, the surface roughness of the semiconductor layer 16 is preferably as large as possible, and the surface roughness factor, defined as effective area/projected area is preferably 10 or more, and more preferably 100 or more. Note that the effective area means an effective surface area that is determined from: a volume which is determined from the projected area and thickness of the semiconductor layer 16; and the specific surface area and bulk density of the material composing the semiconductor layer 16.

Other than $TiO_2$, the semiconductor layer 16 may be formed by using the following inorganic semiconductors. For example, oxides of metallic elements such as Cd, Zn, In, Pb, Mo, W, Sb, Bi, Cu, Hg, Ti, Ag, Mn, Fe, V, Sn, Zr, Sr, Ga, Si, and Cr, perovskites such as $SrTiO_3$ and $CaTiO_3$, sulfides such as CdS, ZnS, $In_2S_3$, PbS, $Mo_2S$, $WS_2$, $Sb_2S_3$, $Bi_2S_3$, $ZnCdS_2$, and $Cu_2S$, and metal chalcogenides such as CdSe, $In_2Se_3$, $WSe_2$, HgS, PbSe, and CdTe can be used; otherwise, GaAs, Si, Se, $Cd_2P_3$, $Zn_2P_3$, InP, AgBr, $PbI_2$, $HgI_2$, $BiI_3$, and the like can be used. Among these, CdS, ZnS, $In_2S_3$, PbS, $Mo_2S$, $WS_2$, $Sb_2S_3$, $Bi_2S_3$, $ZnCdS_2$, $Cu_2S$, InP, $Cu_2O$, CuO, and CdSe have an advantage of being able to absorb light of a wavelength on the order of 350 nm to 1300 nm. Furthermore, a composite including at least one or more kinds selected from the aforementioned semiconductors can be used, such as $CdS/TiO_2$, CdS/AgI, $Ag_2S/AgI$, CdS/ZnO, CdS/HgS, CdS/PbS, ZnO/ZnS, ZnO/ZnSe, CdS/HgS, $CdS_x/CdSe_{1-x}$, $CdS_x/Te_{1-x}$, $CdSe_x/Te_{1-x}$, ZnS/CdSe, ZnSe/CdSe, CdS/ZnS, $TiO_2/Cd_2P_2$, $CdS/CdSeCd_yZn_{1-y}S$, and CdS/HgS/CdS. Furthermore, organic semiconductors such as polyphenylene vinylene, polythiophene, polyacetylene, tetracene, pentacene, and phthalocyanine can also be used.

The semiconductor layer 16 can be used by various known methods. In the case of using an inorganic semiconductor, for example, a mixture of a powder of semiconductor material and an organic binder (containing an organic solvent) is applied to the conductive layer 14, and then subjected to a heat treatment in order to remove the organic binder, whereby the semiconductor layer 16 of an inorganic semiconductor is obtained. As the method of applying the aforementioned mixture, various known coating techniques or printing techniques can be adopted. Examples of coating techniques include the doctor blade method, the bar coating method, the spraying method, the dip coating method, and the spin coating method. Examples of printing techniques include screen printing techniques. Moreover, a film of the mixture may be pressurized as necessary.

In the case of using an organic semiconductor, too, the semiconductor layer 16 can be formed by various known methods. A solution of organic semiconductor may be applied on the conductive layer 14 by using various known coating techniques or printing techniques. Moreover, in the case of using a polymer semiconductor with a number-average molecular weight of 1000 or more, for example, coating techniques, e.g., the spin coating method and the drop cast method, and printing techniques, e.g., screen printing and gravure printing, are possible. In addition to these wet processes, dry processes such as sputtering techniques and vapor deposition techniques may also be adopted.

As the photosensitizing agent, for example, ultrafine semiconductor particles, a dye, or a pigment can be used. An inorganic material or an organic material, or a mixture thereof may be used. Dyes are preferable from the standpoint of efficiently absorbing light and separating charges, including 9-phenylxanthene-type dyes, coumarin-type dyes, acridine-type dyes, triphenylmethane-type dyes, tetraphenylmethane-type dyes, quinone-type dyes, azo-type dyes, indigo-type dyes, cyanine-type dyes, merocyanine-type dyes, xanthene-type dyes, and the like. Alternative examples include: ruthenium-cis-diaqua-bipyridyl complexes of the $RuL_2(H_2O)_2$ type (where L represents 4,4'-dicarboxyl-2,2'-bipyridine); transition metal complexes of the types ruthenium-tris ($RuL_3$), ruthenium-bis ($RuL_2$), osmium-tris ($OsL_3$), osmiumbis (OsL$_2$), and so on; or zinc-tetra(4-carboxyphenyl)porphyrin, iron-hexacyanide complexes, and phthalocyanine. Otherwise, for example, the dyes described in the chapter dedicated to DSSCs in "FPD.DSSC.Hikari Memori to Kinouseishikiso no Saishingijutsu to Zairyokaihatsu (or, LATEST TECHNOLOGIES AND MATERIAL DEVELOPMENT IN FPD/DSSC/OPTICAL MEMORIES AND FUNCTIONAL DYES)" (NTS, Inc.) are also applicable. Among these, dyes having association ability may densely aggregate to cover the semiconductor surface, thus functioning as an insulator layer. When the photosensitizing agent functions as an insulator layer, it is possible to confer rectification ability to the charge separation interface (the interface between the photosensitizing agent and the semiconductor), thus suppressing the charge recombination after charge separation.

As a dye having association ability, a dye molecule having the structure represented by the chemical formula of [Formula 1] is preferable, such as a dye molecule having the structure represented by the chemical formula of [Formula 2]. Note that the determination as to whether dye molecules have formed an association or not can be easily made by comparing the absorption spectrum of dye molecules which are dissolved in an organic solvent or the like and the absorption spectrum of the dye molecules which are carried on the semiconductor.

[Formula 1]

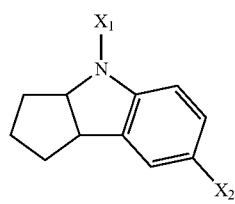

(where $X_1$ and $X_2$ each independently include at least one kind of group selected from the group consisting of an alkyl group, an alkenyl group, an aralkyl group, an aryl group, and a heterocycle, where the at least one kind of group may each independently include a substituent. $X_2$ has a carboxyl group, a sulfonyl group, or a phosphonyl group, for example)

[Formula 2]

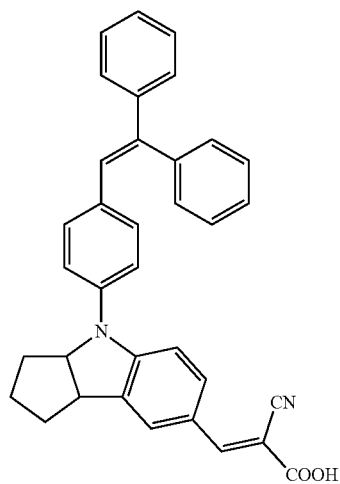

Examples of ultrafine semiconductor particles which can be used as the photosensitizing agent include ultrafine particles of sulfide semiconductors, such as cadmium sulfide, lead sulfide, and silver sulfide. The diameter of ultrafine semiconductor particles is 1 nm to 10 nm, for example.

The photosensitizing agent is carried on the semiconductor by various known methods. One example method is where a substrate having a semiconductor layer (e.g., a porous semiconductor not containing a photosensitizing agent) formed thereon is immersed in a solution in which the photosensitizing agent is dissolved or dispersed. As the solvent of this solution, anything that allows the photosensitizing agent to be dissolved may be selected as appropriate, e.g., water, alcohol, toluene, dimethylformamide. Moreover, during immersion in the photosensitizing agent solution, heating or ultrasonic wave application may be conducted. Moreover, after the immersion, cleaning and/or heating with a solvent (e.g., alcohol) may be performed to remove excess photosensitizing agent.

The carried amount of the photosensitizing agent in the semiconductor layer 16 is in the range of $1 \times 10^{-10}$ to $1 \times 10^{-4}$ mol/cm$^2$, for example. From the standpoint of photoelectric conversion efficiency and cost, the range of $0.1 \times 10^{-8}$ to $9.0 \times 10^{-6}$ mol/cm$^2$ is preferable, for example.

Note that CdS, ZnS, In$_2$S$_3$, PbS, Mo$_2$S, WS$_2$, Sb$_2$S$_3$, Bi$_2$S$_3$, ZnCdS$_2$, Cu$_2$S, InP, Cu$_2$O, CuO, and CdSe mentioned above are able to absorb light of a wavelength on the order of 350 nm to 1300 nm. Therefore, when the semiconductor layer is formed by using these, the photosensitizing agent may be omitted.

<Counter Electrode>

The counter electrode 32, which functions as a positive electrode of the photoelectric conversion element, receives holes from the subsequently-described solid compound layer 22 and supplies electrons to the solid compound layer 22. Examples of the material composing the counter electrode 32 include: metals such as platinum, gold, silver, copper, aluminum, rhodium, and indium; carbon materials such as graphite, carbon nanotubes, and carbon on which platinum is carried; electrically-conductive metal oxides such as indium-tin complex oxide, tin oxide doped with antimony, and tin oxide doped with fluorine; and electrically conductive polymers such as polyethylene dioxythiophene, polypyrrole, and polyaniline. Among these, platinum, graphite, polyethylene dioxythiophene, and the like are preferable.

Moreover, in a construction as illustrated in FIG. 1, where the counter electrode 32 is disposed between the photoanode 15 and the charge storage electrode 55, the counter electrode 32 has throughholes through which the electrolyte solution 24 can pass. Examples of such a counter electrode 32 include a mesh electrode, a grid electrode, a separator with a conductive layer formed thereon, and a porous body of electrically conductive material. As the mesh electrode, commercially-available general-purpose platinum meshes can be used, for example. A separator with a conductive layer formed thereon can be produced by depositing gold, platinum, or the like on a separator, by a sputtering technique or a vapor deposition technique, for example.

<Electrolyte Medium>

The electrolyte medium 24 is typically an electrolyte solution 24. The electrolyte solution 24 contains a supporting electrolyte (supporting electrolyte) and a solvent.

Examples of the supporting electrolyte include: ammonium salts such as tetrabutylammonium perchlorate, tetraethylammonium hexafluorophosphate, imidazolium salt, and pyridinium salt; and alkali metal salts such as lithium perchlorate and boron tetrafluoride potassium.

Preferable solvents are those with good ion conductivity. Although either aqueous solvents or organic solvents can be used as the solvent, organic solvents are preferable because they better stabilize the solute. Examples include: carbonate compounds such as dimethyl carbonate, diethyl carbonate, methylethyl carbonate, ethylene carbonate, and propylene carbonate; ester compounds such as methyl acetate, methyl propionate, and γ-butyrolactone; ether compounds such as diethyl ether, 1,2-dimethoxyethane, 1,3-dioxosilane, tetrahydrofuran, and 2-methyl-tetrahydrofuran; heterocyclic compounds such as 3-methyl-2-oxazolidinone, and 2-methylpyrrolidone; nitrile propionates such as acetonitrile, methoxyacetonitrile, and propionitrile; and aprotic polar compounds such as sulfolane, dimethyl sulfoxide, and dimethylformamide. Each of these can be used by itself, or two or more of them may be used in a mixture. Preferable among others are: carbonate compounds such as ethylene carbonate and propylene carbonate; heterocyclic compounds such as γ-butyrolactone, 3-methyl-2-oxazolidinone, and 2-methylpyrrolidone; and nitrile propionates such as acetonitrile, methoxyacetonitrile, propionitrile, 3-methoxypropionitrile, and valeronitrile.

As the solvent, an ionic liquid may be used, or mixed in the aforementioned solvents. Using an ionic liquid can improve the effect of stabling the oxidation-reduction site of the solid compound layer 22, which the electrolyte solution is in contact with. Moreover, ionic liquids are characterized by their low volatility and high resistance against fire.

As the ionic liquid, known ionic liquids at large can be used. Examples thereof include ionic liquids of imidazolium-types such as 1-ethyl-3-methylimidazolium tetracyanoborate pyridine-types, alicyclic amine-types, aliphatic amine-types, and azonium amine-types, and what is described in the specification of European Patent No. 718288, International Publication No. 95/18456, Electrochemistry, vol. 65, No. 11, p. 923 (1997), J. Electrochem. Soc., vol. 143, No. 10, p. 3099 (1996), and Inorg. Chem., vol. 35, p 1168 (1996).

As mentioned earlier, the electrolyte solution 24 preferably contains no oxidation-reduction substance, and the oxidation-reduction substance to be contained in the electrolyte solution 24 is 10 mM at the most, for example.

An oxidation-reduction substance means a pair of substances which exist in a reversible manner as an oxidant and a reductant, in an oxidation-reduction reaction. Examples of oxidation-reduction substances include chlorine compound-chlorine, iodine compound-iodine, bromine compound-bromine, thallium ions (III)-thallium ions (I), mercury ions (II)-mercury ions (I), ruthenium ions (III)-ruthenium ions (II), copper ions (II)-copper ions (I), iron ions (III)-iron ions (II), nickel ions (II)-nickel ions (III), vanadium ions (III)-vanadium ions (II), and manganate ions-permanganate ions.

When any such oxidation-reduction substance exists in the electrolyte solution, the self-discharge during electrical storage increases. This is because the oxidation-reduction substance functions as a mediator of discharging, in between the solid compound layer and the charge electric storage electrode. The oxidation-reduction substance contained in the electrolyte solution is 10 mM at the most, preferably 1 mM or less, and more preferably 0.1 mM or less.

Other than an electrolyte solution, the electrolyte medium 24 may be a gel electrolyte or a polymer electrolyte. For example, a gel electrolyte can be obtained by mixing a gelling agent in an electrolyte solution. Examples of the gelling agent include gelling agents which produce a polymer through a cross-linking reaction, gelling agents containing a polymerizable multifunctional monomer, and oil gelling agents. As the gelated electrolyte or the polymer electrolyte, what is commonly used is applicable: for example, vinylidene fluoride-type polymerization products such as polyvinylidene fluoride; acrylic acid-type polymerization products such as polyacrylic acid; acrylonitrile-type polymerization products such as polyacrylonitrile; and polyether-type polymerization products such as polyethylene oxide; or polymerization products having an amide structure in their structure.

<Solid Compound Layer>

As mentioned earlier, the solid compound layer 22 is typically structured so as to internally contain the electrolyte solution 24. The solid compound layer 22 includes a polymer gel layer containing a polymer having an oxidation-reduction site, for example. Alternatively, the solid compound layer 22 contains a porous body or a solid that is capable of intercalation. In the case where the solid compound layer 22 contains a porous body or a solid that is capable of intercalation, the solid compound layer 22 further contains electrically conductive carbon, for example. Examples of the solid that is capable of intercalation include $LiCoO_2$, $LiMnO_2$, and $LiNiO_2$; fine powder of these, an electrically conductive carbon material, and a binder are to be used in a mixture. The electrically conductive carbon material transports holes to the counter electrode 32, and reduces the oxidized photosensitizing agent. The solid compound layer 22 functions as an oxidation-reduction substance, and also functions to immobilize or retain the oxidation-reduction substance.

The solid compound layer 22 is provided so as to be in direct contact with the photoanode 15 and the counter electrode 32, as illustrated in FIGS. 1(a) and (b); however, an electron transport layer may be provided between the photoanode 15 and the solid compound layer 22. As the electron transport layer, an n-type gel layer described in Patent Document 1 can be used, for example.

Next, the polymer which is contained in the polymer gel layer will be described in detail.

The polymer gel layer contains a polymer and an electrolyte solution. The polymer gel layer is in a state where the electrolyte solution has been taken into a mesh structure that is created by the polymer, and is in a solid state as a whole. The polymer preferably has a number-average molecular weight of 1000 or more, and further preferably contains substantially no low-molecular weight component with a molecular weight of less than 1000. Although there is no particular upper limit to the molecular weight of the polymer, it may be 1 million or less, for example. Eliminating the low-molecular weight component restrains the low-molecular weight component having an oxidation-reduction site from eluting into the electrolyte solution 24 and being reduced at the charge storage electrode 55. The amount of the low-molecular component with a molecular weight or 1000 or less that is contained in the polymer can be decreased via purification by precipitation or the like. As for the concentration of the oxidation-reduction substance which elutes from the polymer into the electrolyte solution, an elution concentration as calculated by the following equation is preferably 1 mM or less, and more preferably 0.1 mM or less. Note that the concentration of the oxidation-reduction substance can be measured by differential pulse voltammogram or the like.

(concentration, in electrolyte solution, of oxidation-reduction substance used in solid compound layer)=(elute concentration)

Moreover, the polymer preferably has a cross-linked structure. Having a cross-linked structure allows to restrain elution of the low-molecular weight component. The cross-linked structure preferably has a chemical cross-linked structure. The reason is that a chemical cross-linked structure has a higher stability than does a physical cross-linked structure which is formed through entanglement of polymer chains. A chemical cross-linked structure can be formed by mixing a cross-linking agent, for example. For example, to the entire monomer from which to generate a polymer, e.g., a 0.1 mol % more, and more preferably 1 mol % more, cross-linking agent may be mixed. Although there is no particular upper limit, it is 30 mol % or less, for example. If the cross-link density is too high, the electrical storage characteristics may be deteriorated.

The polymer contained in the polymer gel layer is a polymerization product of a monomer, for example, where a structure corresponding to a single monomer is referred to as a "repeat unit". This will simply be referred to as a "unit" herein. The monomer is not limited to being one kind, and two or more kinds of monomers may be polymerized to generate a polymer. For example, when a monomer having only one polymerizable group (hereinafter referred to as a "monofunctional monomer") is polymerized, a chain-like polymer is obtained. If a monomer having two or more polymerizable groups (hereinafter referred to as a "multifunctional monomer") is mixed in a monofunctional monomer, a polymer having a cross-linked structure is obtained. Moreover, polymer chains can be cross-linked to one another by adding a cross-linking agent.

The polymer used for the photoelectric conversion element 100 according to an embodiment of the present disclosure has an oxidation-reduction site which is capable of repetitive oxidation/reduction. An oxidation-reduction site refers to a portion which is capable of stably gaining/losing electrons through an oxidation-reduction reaction (redox reaction), and refers to a stable radical such as a nitroxyl radical, for example. Moreover, among the units composing a polymer, any unit having an oxidation-reduction site will be referred to as an oxidation-reduction unit (or a redox unit), and any unit other than oxidation-reduction units will be referred to as a "fundamental unit". An oxidation-reduction unit refers to TEMPO (2,2,6,6-tetramethylpiperidine 1-oxyl) having a nitroxyl radical, for example. As for the bond between the fundamental unit and the oxidation-reduction unit, for example, an oxidation-reduction unit may be bonded as a side chain to a main chain which is composed of fundamental units; or both fundamental units and oxidation-reduction units may compose the main chain. The fundamental units and the oxidation-reduction units may each include a plural kinds of units, and the fundamental units and the oxidation-reduction units may each include a cross-link unit corresponding to a multifunctional monomer. Although the units are illustrated as corresponding to the monomers for simplicity of explanation, this is not a limitation; the units may be component units corresponding to oligomers or polymers.

Assume that a polymer having the aforementioned oxidation-reduction site is expressed by general formula (1).

$$(X_i)_{nj} \cdot Y_k \qquad (1)$$

$X_i$ denotes a fundamental unit, and Y denotes an oxidation-reduction unit. $(X_i)_n$ represents a basic polymerization unit which is composed of n $X_i$'s being bonded together. $(X_i)_{nj}$ represents a polymer having j basic polymerization units $(X_i)_n$, whereas $Y_k$ represents a polymer having k Y's. n is an integer of 2 or more, and j and k are, each independently, an integer of 1 or more. The upper limits of n, j, and k are 100 thousand, for example. The oxidation-reduction unit Y may be bonded to any position of the basic polymerization unit $(X_i)_n$, and $X_i$ and Y may each be two or more kinds. When Y is two or more kinds, they preferably have oxidation-reduction sites of close oxidation-reduction potentials to each other, from the standpoint of electron exchange reaction.

Examples of polymers having an oxidation-reduction site include: polymers having a quinone derivative resulting from chemical bonding of quinones; polymers having an imide derivative containing imide; polymers having a phenoxyl derivative containing phenoxyl; and polymers having a viologen derivative containing viologen.

Among the aforementioned polymers, examples of polymers having a quinone derivative include those having the chemical structures of [Formula 3] to [Formula 6] below. In [Formula 3] to [Formula 6], R represents saturated or unsaturated hydrocarbons such as methylene, ethylene, propane-1,3-dienyl, ethylidene, propane-2,2-diyl, alkanediyl, benzylidene, propylene, vinylidene, propane-1,3-diyl, and but-1-ene-1,4-diyl; cyclic hydrocarbons such as cyclohexanediyl, cyclohexenediyl, cyclohexadienediyl, phenylene, naphthalene, and biphenylene; keto and divalent acyl groups such as oxalyl, malonyl, succinyl, glutamyl, adipoyl, alkanediyl, sebacoyl, fumaroyl, maleoyl, phthaloyl, isophthaloyl, and terephthaloyl; ethers and esters such as oxy, oxymethylenoxy, and oxycarbonyl; sulfur-containing groups such as sulfanediyl, sulfanyl, and sulfonyl; nitrogen-containing groups such as imino, nitrilo, hydrazo, azo, azino, diazoamino, urylene, and amide; silicon-containing groups such as silanediyl and disilane-1,2-diyl; and groups obtained through substitution of these groups at the terminal, or composite groups thereof.

[Formula 3] is an example of a polymer which is formed via chemical bonding of anthraquinone to the main chain. [Formula 4] is an example of a polymer whose main chain is composed of fundamental units containing anthraquinone. [Formula 5] is an example of a polymer having cross-link units containing anthraquinone. Furthermore, [Formula 6] is an example of anthraquinone which has a protogenic group forming an intramolecular hydrogen bond with an oxygen atom.

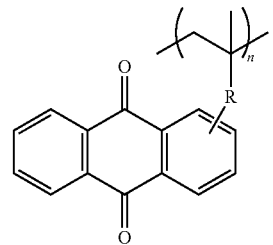

[Formula 3]

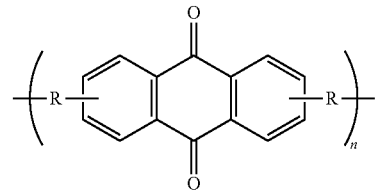

[Formula 4]

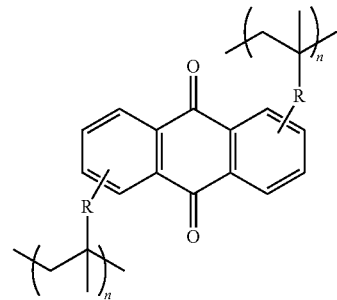

[Formula 5]

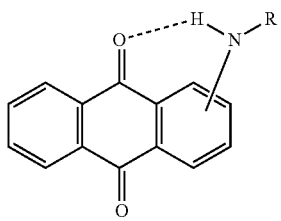

As a polymer whose oxidation-reduction units Y have an imide derivative, polyimides as shown in [Formula 7] and [Formula 8] can be used. In [Formula 7] and [Formula 8], $R_1$ to $R_3$ are: an aromatic group such as a phenylene group; an aliphatic chain such as an alkylene group or an alkyl ether; or an ether group, and the portion excluding $R_1$ to $R_3$ is the oxidation-reduction unit Y. The polyimide backbone may be cross-linked at $R_1$ to $R_3$. Note that phthalimide and pyromellitimide have oxidation-reduction ability.

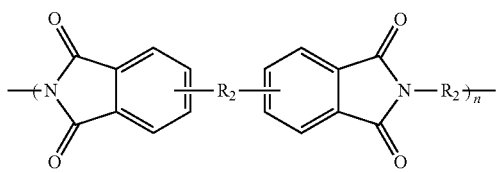

[Formula 7]

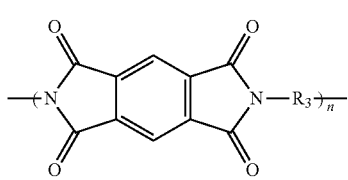

[Formula 8]

An example of a polymer having a phenoxyl derivative is a galvinoxy polymer as shown in [Formula 9]. In this galvinoxy polymer, a galvinoxyl radical shown in [Formula 10] corresponds to an oxidation-reduction site. In [Formula 10], "." represents an unpaired electron.

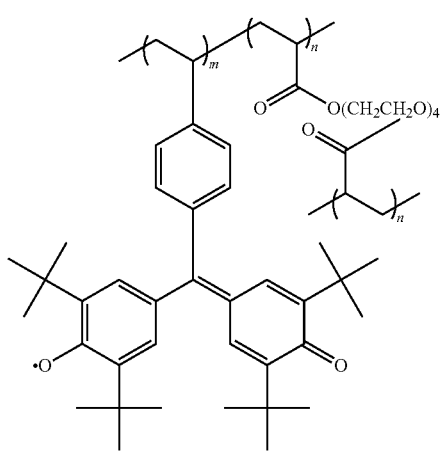

[Formula 9]

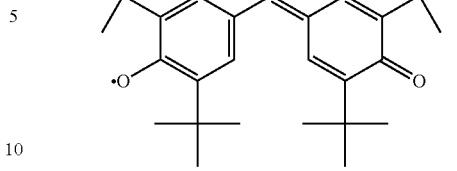

[Formula 10]

Examples of polymers having a viologen derivative include polyviologens as shown in [Formula 11] and [Formula 12]. In these polyviologens, the portion show in [Formula 13] corresponds to an oxidation-reduction unit Y.

[Formula 11]

[Formula 12]

[Formula 13]

In [Formula 1] to [Formula 3], [Formula 5] to [Formula 7], [Formula 9], and [Formula 10], m and n represent the number of units being repeated (corresponding to the degree of polymerization), which is 1 or an integer of 2 or more, with an upper limit of 100 thousand, for example.

A polymer having a stable radical as an oxidation-reduction site has an advantage in that the charge exchange between stable radicals is fast, for example. Stable radicals generate radicals through at least one of the electrochemical oxidation reaction and electrochemical reduction reaction processes. Although there is no particular limitation as to the stable radical species, nitroxy radical (NO.) is preferable.

A polymer having a stable radical includes, for example, at least one of [Formula 14] and [Formula 15] below as the oxidation-reduction unit Y in general formula (1) above.

[Formula 14]

In [Formula 14], substituent $R^1$ is an substituted or unsubstituted alkylene group with a carbon number of 2 to 30, an alkenylene group with a carbon number of 2 to 30, or an arylene group with a carbon number of 4 to 30; and X is a nitroxyl radical group, or preferably, an oxy radical group, a sulfur radical group, a hydrazyl radical group, a carbon radical group, a boron radical group, etc. $n^1$ is an integer of 2 or more.

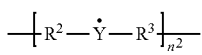
[Formula 15]

In [Formula 15], substituents $R^2$ and $R^3$ are, each independently, a substituted or unsubstituted alkylene group with a carbon number of 2 to 30, an alkenylene group with a carbon number of 2 to 30, or an arylene group with a carbon number of 4 to 30; and Y is a nitroxyl radical group, a sulfur radical group, a hydrazyl radical group, or a carbon radical group, where $n^2$ is an integer of 2 or more.

Examples of the stable radicals Y. shown in [Formula 14] and [Formula 15] include an oxy radical, a nitroxyl radical, a carbon radical, a nitrogen radical, a boron radical, and a sulfur radical.

Specific examples of oxy radicals include aryloxy radicals as shown in [Formula 16] and [Formula 17] below, and a semiquinone radical as shown in [Formula 18].

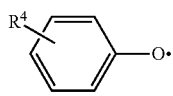
[Formula 16]

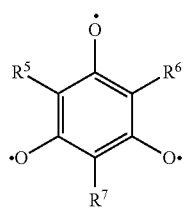
[Formula 17]

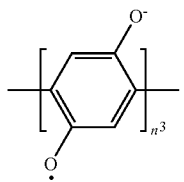
[Formula 18]

In [Formula 16] to [Formula 18], substituent $R^4$ to $R^7$ are, each independently, a hydrogen atom, a substituted or unsubstituted aliphatic or aromatic hydrocarbon group with a carbon number of 1 to 30, a halogen group, a hydroxyl group, a nitro group, a nitroso group, a cyano group, an alkoxy group, an aryloxy group, or an acyl group.

Specific examples of nitroxyl radicals include a stable radical having a peridinoxy ring as shown in [Formula 19] below, a stable radical having a pyrrolidinoxy ring as shown in [Formula 20], a stable radical having a pyrrolinoxy ring as shown in [Formula 21], and a stable radical having a nitronyl nitroxide structure as shown in [Formula 22].

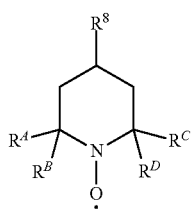
[Formula 19]

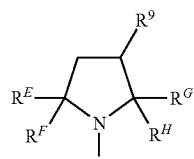
[Formula 20]

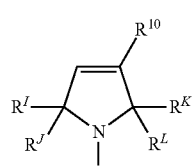
[Formula 21]

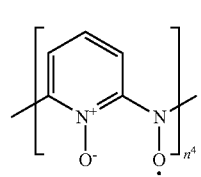
[Formula 22]

In [Formula 19] to [Formula 22], $R^8$ to $R^{10}$ and $R^A$ to $R^L$ are, each independently, a hydrogen atom, a substituted or unsubstituted aliphatic or aromatic hydrocarbon group with a carbon number of 1 to 30, a halogen group, a hydroxyl group, a nitro group, a nitroso group, a cyano group, an alkoxy group, an aryloxy group, or an acyl group. In [Formula 22], $n^4$ is an integer of 2 or more.

Specific examples of nitroxyl radicals include a radical having a trivalent hydrazyl group as shown in [Formula 23] below, a radical having a trivalent verdazyl group as shown in [Formula 24], and a radical having an aminotriazine structure as shown in [Formula 25].

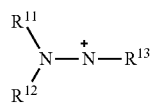
[Formula 23]

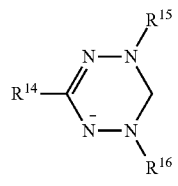
[Formula 24]

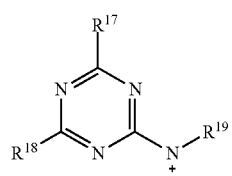
[Formula 25]

In [Formula 23] to [Formula 25], $R^{11}$ to $R^{19}$ are, each independently, a hydrogen atom, a substituted or unsubstituted aliphatic or aromatic hydrocarbon group with a carbon number of 1 to 30, a halogen group, a hydroxyl group, a nitro group, a nitroso group, a cyano group, an alkoxy group, an aryloxy group, or an acyl group.

Polymers having the radicals shown in [Formula 14] to [Formula 25] have good stability, and therefore can be stably used in photoelectric conversion elements and energy storing elements. Thus, photoelectric conversion elements having good stability and good response speed can be provided.

Examples of polymers having a stable radical include nitroxy radical polymers as shown in [Formula 26] to [Formula 29] below.

[Formula 26]

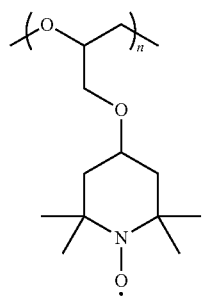

[Formula 27]

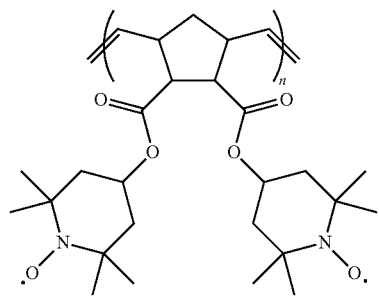

[Formula 28]

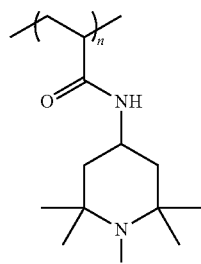

[Formula 29]

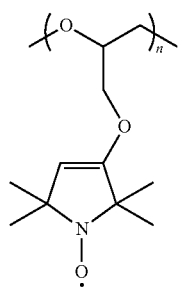

In [Formula 26] to [Formula 29], n is the number of units being repeated (corresponding to the degree of polymerization), which is an integer of 1 or more, with an upper limit of 100 thousand, for example.

Preferably, the polymer gel layer further contains a conductivity aid. A polymer gel having a stable radical as an oxidation-reduction site is electrically conductive in an electrolyte solution; however, the internal resistance can be further decreased by mixing a conductivity aid. Consequently, the charge-discharge capacity of the photoelectric conversion element can be increased, or its discharge rate can be enhanced. For example, a conductivity aid is fine particles with low resistance; electrically conductive carbon, graphite, elemental metals, semiconductors doped with impurities, etc., can be used. In particular, carbon materials such as vapor-phase grown carbon fibers and carbon nanotubes can be suitably used, for example. The particle size of fine particles is e.g., 1 nm to 100 µm, and preferably 1 nm to 10 µm, and more preferably 1 nm to 1 µm. Moreover, particles with a high aspect ratio can also be used.

<Charge Storage Electrode>

As mentioned earlier, the charge storage electrode 55 includes, for example, the oxide conductive layer 54, the metal layer 56 formed on the oxide conductive layer 54, and the charge storage layer 58 formed on the metal layer 56. The charge storage layer 58 can be formed by using, for example, a mixture of tungsten oxide and electrically conductive carbon, or a resin with graphite being dispersed therein (an active substance for capacitors), an oxidation-reduction substance (e.g., polymer compound capable of oxidation/reduction) such as poly(decamethylferrocene), and an electrically conductive polymer such as polypyrrole, which is described in Patent Document 2.

EXAMPLES

Hereinafter, the aforementioned embodiment of the present disclosure will be specifically described by way of Examples. Photoelectric conversion elements according to Examples 1 to 5 and Comparative Examples 1 to 3 were produced, and their characteristics were evaluated. The results of evaluation are shown altogether in Table 1.

Example 1

A photoelectric conversion element having substantially the same structure as that of the photoelectric conversion element 100 shown in FIG. 1 was produced. The respective component elements were as follows.

substrate 12: glass substrate thickness 1 mm transparent conductive layer 14: fluorine-doped $SnO_2$ layer (surface resistance 10Ω/□)

semiconductor layer 16: porous titanium oxide, photosensitizing dye (D131, manufactured by Mitsubishi Chemical Corporation)

solid compound layer 22: mixture of poly((2,2,6,6-tetramethylpiperidine-1-oxyl-oxyl-4-yl)-glycidyl ether) and vapor-phase grown carbon fibers (denoted as "C" in Table 1) (mass ratio 2:1)

counter electrode 32: meshed platinum electrode electrolyte solution 24: electrolyte solution obtained by dissolving N-methylbenzimidazole at 0.025 mol/l and lithium perchlorate at 0.1 mol/l in acetonitrile substrate 52: glass substrate thickness 1 mm oxide conductive layer 54: fluorine-doped $SnO_2$ layer (surface resistance 10Ω/□)

metal layer 56: platinum layer charge storage layer 58: material obtained by mixing tungsten oxide ($WO_3$) and vapor-phase grown carbon fibers at a mass ratio of 5:1

The photoelectric conversion element of Example 1 was produced as follows.

Two electrically conductive glass substrates (manufactured by Asahi Glass, Co., Ltd.) with a thickness of 1 mm, having a fluorine-doped $SnO_2$ layer, were provided. These were used as a substrate 12 having a transparent conductive layer 14 and a substrate 52 having an oxide conductive layer 54.

High-purity titanium oxide powder with an average primary particle size of 20 nm was dispersed in ethyl cellulose, thus producing a paste for screen printing.

After forming a titanium oxide layer with a thickness of about 10 nm on the fluorine-doped $SnO_2$ layer of one of the electrically conductive glass substrates by sputtering technique, the aforementioned paste was applied thereon and dried, and the resultant dry matter was baked in the air at 500° C. for 30 minutes, thereby forming a porous titanium oxide layer (titanium coating) with a thickness of 2 μm.

Next, the substrate having the porous titanium oxide layer formed thereon was immersed in an acetonitrile-butanol 1:1 mixed solvent solution containing the photosensitizing dye (D131 (manufactured by Mitsubishi Paper Mills Limited)) as shown in [Formula 13] at a concentration of 0.3 mM, and left still in a dark place at room temperature for 16 hours, thus allowing the photosensitizing agent to be carried on the porous titanium oxide layer. Thus, a photoanode 15 was formed.

Platinum was deposited on the surface of the other electrically conductive glass substrate by sputtering technique, thereby forming a metal layer 56.

0.5 g of tungsten oxide (WO3: manufactured by WAKO) and 0.1 g of VGCF (a vapor-phase grown carbon fibers manufactured by Showa Denko K.K.; a registered trademark) were placed in a mortar, and agitated and mixed for 10 minutes. After mixing, 1 ml of NMP (n-methylpyrrolidone) and 0.1 mg of PVDF (polyvinylidene fluoride) were added, followed by further agitation for 10 minutes, whereby a slurried suspension was obtained.

On the metal layer 56, the above slurry was applied to a thickness of 10 μm by the blade method, thereby forming a charge electric storage layer 58.

A polymer as shown in [Formula 30] below was used for forming the solid compound layer 22.

[Formula 30]

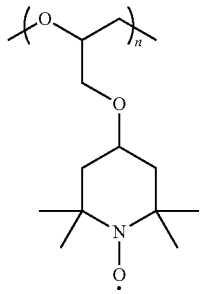

The method of production was as follows.

To 4 ml of a 50 mass % sodium hydroxide aqueous solution, 2.5 ml of epichlorohydrin (30 mmol) and 84 mg of tetrabutyl ammonium sodium hydrogensulfate (239 μmol) were added, and agitated. To this, 1.03 g of 4-hydroxy-2,2,6,6 tetramethylpiperidine-1-oxyl (5.98 mmol) was further added, and allowed to react at room temperature for 12 hours. Next, by using an ether/hexane mix solvent (mixing ratio by volume=1/1) based on ether extraction, and conducting a column purification, 1.14 g of 4-glycidyloxy-2,2,6,6-tetramethylpiperidine-1-oxyl was obtained (percentage yield 84%).

In tetrahydrofuran (=THF), with 5.6 mg of tert-butoxypotassium (=t-BuOK) (0.05 mmol) being added as a polymerization initiator, 228 mg of 4-glycidyloxy-2,2,6,6-tetramethylpiperidine-1-oxyl (1.00 mmol) obtained as above was allowed to react at 60° C. for 24 hours in a nitrogen ambient, followed by a purification by reprecipitation in diethyl ether, whereby orange powder of poly((2,2,6,6-tetramethylpiperidine-1-oxyl-oxyl-4-yl)-glycidyl ether) (hereinafter abbreviated as PTGE) was obtained (see structural formula [Formula 30]).

The molecular weight of the resultant polymer was as follows: a number-average molecular weight of 3600 (as converted into polystyrene); a degree of dispersion (weight-average molecular weight/number-average molecular weight) of 1.4 (yield 150 mg, percentage yield 66%).

In 1 ml of a DMF solvent, 10 mg of PTGE and 20 mg of VGCF (vapor-phase grown carbon fibers manufactured by Showa Denko K.K.; a registered trademark) were suspended, and this was used to spin-coat the photoanode 15, thereby forming a solid compound layer 22 with a thickness of 10 μm.

Next, a platinum mesh electrode (commercial product) was placed on the solid compound layer 22 and pressed from above, thereby forming a counter electrode 32. At this time, through pressing from above, a counter electrode 32 which was in direct contact with the solid compound layer 22 was formed.

Next, in a manner of surrounding the portion of the photoanode 15 in which the porous titanium oxide layer had been formed, a sealing material of hot-melt adhesive ("Bynel" manufactured by Dupont-Mitsui Polychemicals Co., Ltd) was placed on the charge storage electrode 55, whereupon the glass substrate having the photoanode 15 formed thereon was placed, and they were attached together with pressurization while being heated. This glass substrate having the charge storage electrode 55 formed thereon had been apertured with a diamond drill.

Next, an electrolyte solution was prepared by dissolving 0.025 mol/l of N-methylbenzimidazole and 0.1 mol/l of lithium perchlorate into acetonitrile, and after this electrolyte was injected through the aforementioned aperture, the aperture was sealed with a UV-curing resin. Thus, the photoelectric conversion element of Example 1 was obtained.

Example 2

As the electrolyte solution in the photoelectric conversion element of Example 1, an electrolyte solution which had been prepared by dissolving 0.01 mol/L of TEMPO (2,2,6,6-tetramethylpiperidine 1-oxyl) (10 mM), 0.025 mol/l of N-methylbenzimidazole, and 0.1 mol/l of lithium perchlorate in acetonitrile was used, thereby obtaining the photoelectric conversion element of Example 2.

Example 3

In the photoelectric conversion element of Example 1, the charge electric storage layer 58 was changed to a layer as follows.

A coating capacitor material Hitasol (a paint obtained by dispersing fine particles of graphite or molybdenum disulfide in a solvent and formed into colloid or paste, manufactured by Hitachi Chemical Co., Ltd.) was applied on a Pt plate, thus obtaining a charge electric storage layer with a thickness of 10 μm.

Example 4

In the photoelectric conversion element of Example 1, the polymer used for forming the solid compound layer 22 was changed to a polymer as shown in [Formula 31] below.

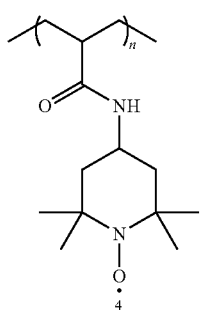

[Formula 31]

A method of synthesizing the polymer shown in [Formula 31] will be described with reference to the scheme shown in [Formula 32].

To 2.8 ml of 4-amino-2,2,6,6,-tetramethylpiperidine (16 mmol), benzene (60 ml) was added, and cooled to a temperature of 0° C.; after agitation, 1.3 ml of acryloyl chloride (16 mmol) was added dropwise, and after cooling at 0° C. for 1 hour, it was agitated overnight at room temperature, thus allowing crystals to deposit. Next, after conducting solvent removal and separation-extraction, it was purified through recrystallization by column chromatography, thereby obtaining Product 2 according to the scheme below with a percentage yield of 54%.

In 1 ml of methanol, 105 mg of Product 2 obtained as above was dissolved, and 1.64 mg of AIBM (azobisisobutyronitrile) was added in a nitrogen ambient; this was agitated overnight at 85° C., thus allowing crystals to deposit. Next, after conducting solvent removal and separation-extraction, it was purified through recrystallization by column chromatography, thereby obtaining Product 3 according to the scheme below.

Furthermore, 150 mg of Product 3 was dissolved in 5.0 ml of THF (tetrahydrofuran), and 1.23 g of mCPBA (3-chloroperoxybenzoic acid) was added in a nitrogen ambient; this was agitated overnight at 85° C. After solvent removal, the resultant crystal was subjected to separation-extraction, and purified through recrystallization by column chromatography, thereby obtaining a compound (poly(2,2,6,6-tetramethylpiperidine-n-oxyl-4-acrylamide)) 4 of the scheme below.

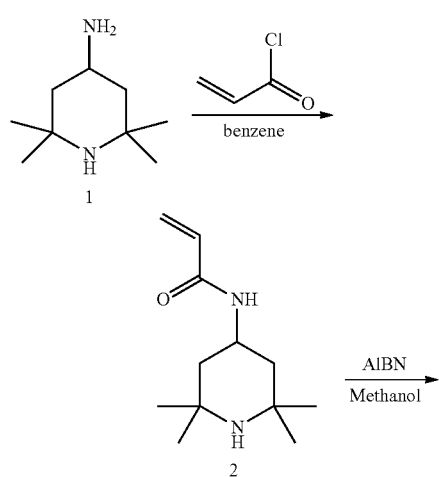

[Formula 32]

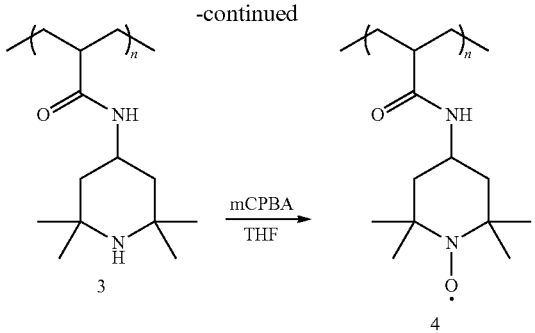

Example 5

In the photoelectric conversion element of Example 1, the charge storage layer 58 was changed to a layer as follows.

Decamethylferrocene as shown in [Formula 33] below was synthesized according to scheme 1 as shown in [Formula 34], thereby obtaining its powder.

Together with barium manganate, the decamethylferrocene was dissolved in a solvent of benzene: diethyl ether=1:1, and agitated at 45° C. for 15 hours. After the reaction was finished, a column purification (chloroform:hexane=1:3) was conducted, thereby obtaining red solid 1 (percentage yield 12%).

The resultant red solid 1 was dissolved in a solvent of acetone:pure water=9:1 together with potassium permanganate and sodium carbonate, and was allowed to react at room temperature for 2 hours; thereafter, a column purification (hexane:chloroform:ethanol=6:3:1) was conducted, thereby obtaining yellow solid 2.

The resultant yellow solid 2 was condensed into PEI ($Mn=1.0\times10^4$, $6.0\times10^4$) by using DMT-MM, thereby obtaining a polymer 3 of decamethylferrocene.

[Formula 33]

Decamethylferrocen

Scheme 1

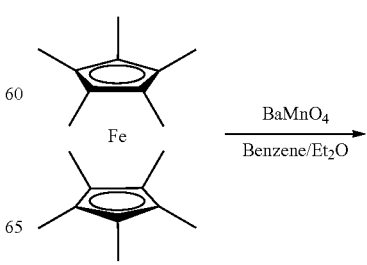

[Formula 34]

-continued

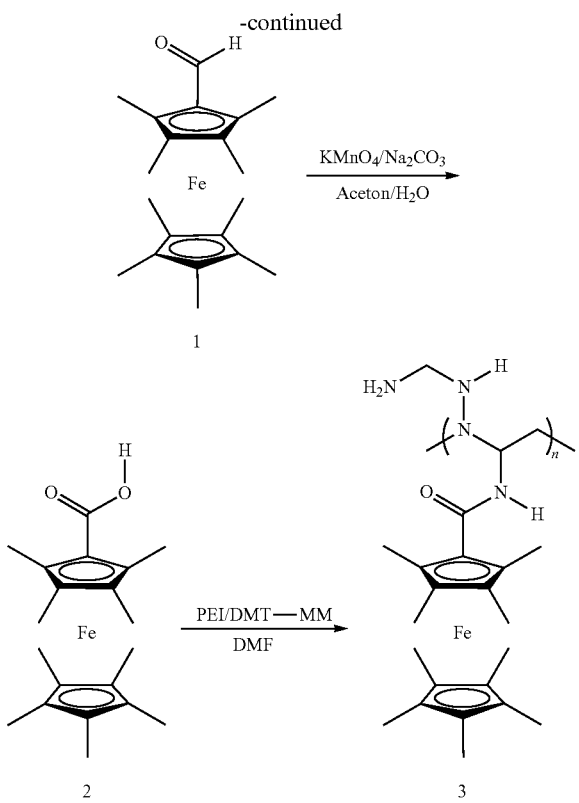

In a mortar, 10 mg of poly(decamethylferrocene) mentioned above, 30 mg of VGCF (manufactured by Showa Denko K.K.; a registered trademark), and 0.1 mg of PVDF were mixed for 10 minutes, and 1 ml of NMP was further added, followed by mixing for 10 minutes, whereby a slurried suspension was obtained. This suspension was applied on a Pt plate by the doctor blade method, thereby obtaining a charge storage layer with a film thickness of 10 μm.

Comparative Example 1

A photoelectric conversion element having the same structure as that of the photoelectric conversion element 300 shown in FIG. 2 was produced. The photoelectric conversion element 300 does not have an electrical storage function.

substrate 12: glass substrate thickness 1 mm
transparent conductive layer 14: fluorine-doped $SnO_2$ layer (surface resistance 10Ω/□)
semiconductor layer 16: porous titanium oxide, photosensitizing dye (D131, manufactured by Mitsubishi Chemical Corporation)
electrolyte solution 44: electrolyte solution obtained by dissolving lithium iodide at 0.01 mol/l, N-methylbenzimidazole at 0.025 mol/l, and lithium perchlorate at 0.1 mol/l in acetonitrile
substrate 52: glass substrate thickness 1 mm
oxide conductive layer 34: fluorine-doped $SnO_2$ layer (surface resistance 10Ω/□)
counter electrode 36: platinum layer
the photoelectric conversion element of Comparative Example 1 was produced by a similar method to that of Example 1. As the electrolyte solution, an electrolyte solution obtained by dissolving lithium iodide at 0.01 mol/l, N-methylbenzimidazole at 0.025 mol/l, and lithium perchlorate at 0.1 mol/l in acetonitrile was used.

Comparative Example 2

A photoelectric conversion element having the same structure as that of the photoelectric conversion element 400 shown in FIG. 3 was produced. Similarly to the photoelectric conversion element described in Patent Document 2, the photoelectric conversion element 400 had a cation exchange membrane 62; the first electrolyte solution 46 contained an oxidation-reduction substance; and the second electrolyte solution 48 contained substantially no oxidation-reduction substance.

The same photoanode 15 and counter electrode 32 as those of Example 1 were used. As the cation exchange membrane, (Nafion: manufactured by Dupont Co., Ltd.) was used. As the first electrolyte solution 46, the same electrolyte solution as that of Comparative Example 1 (an electrolyte solution obtained by dissolving lithium iodide at 0.01 mol/l, N-methylbenzimidazole at 0.025 mol/l, and lithium perchlorate at 0.1 mol/l in acetonitrile) was used. As the second electrolyte solution 48, an electrolyte solution obtained by dissolving lithium perchlorate at 0.1 mol/l in acetonitrile was used.

Comparative Example 3

In the photoelectron conversion element of Comparative Example 2, TEMPO (2,2,6,6-tetramethylpiperidine 1-oxyl) was used instead of lithium iodide, thereby obtaining a photoelectric conversion element of Comparative Example 3.

[Method of Evaluation]

Measurement of Open-Circuit Voltage and Short-Circuit Current

The photoelectric conversion element was irradiated with light of an illuminance of 200 1x by using a stabilized fluorescent lamp, and its current-voltage characteristics were measured, and a conversion efficiency after the current-voltage characteristics became stable was determined. Although this measuring environment is about 1/500 of sunlight, it will be appreciated that the same is also applicable under sunlight, and no limitation as to applications is meant. The results are shown in Table 1.

The photoelectric storage function is indicated as follows: when transitioning to a dark state, relative to an open-circuit voltage in an light-irradiated state, "X" means that a decrease in open-circuit voltage reached 200 mV or more within 10 seconds from transitioning to a dark state; and "○" means that the decrease in open-circuit voltage was less than 200 mV.

As for the discharge characteristics, in a light-irradiated state, short-circuiting was allowed to occur between the charge storage layer and the counter electrode, and an average discharge current flowing 1 second after short-circuiting was measured. A discharge rate thereof is shown in Table 1.

TABLE 1

| | solid compound layer | charge electric storage layer | open-circuit voltage (mV) | short-circuit current (µV/cm²) | photoelectric storage | discharge rate |
|---|---|---|---|---|---|---|
| Example 1 | PTGE/C | WO₃ | 720 | 7.2 | ○ | 87 |
| Example 2 | PTGE/C | WO₃ | 650 | 12.4 | ○ | 84 |
| Example 3 | PTGE/C | capacitor | 660 | 6.8 | ○ | 93 |
| Example 4 | PTMA/C | capacitor | 640 | 7.4 | ○ | 98 |
| Example 5 | PTGE/C | poly(deca methylferrocene) | 700 | 5.2 | ○ | 68 |
| Comparative Example 1 | — | — | 550 | 18.1 | x | — |
| Comparative Example 2 | — | WO₃ | 550 | 18.3 | ○ | 23 |
| Comparative Example 3 | — | WO₃ | 650 | 16.2 | ○ | 21 |

From the results of Table 1, it was found that the photoelectric conversion elements of Examples 1 to 5 possessed an electrical storage function and also a higher discharge rate than that of the photoelectric conversion element of the construction having a cation exchange membrane as described in Patent Document 2.

Regarding the photoelectric conversion element of Example 1, results of measuring voltage changes over time after transitioning from a light-irradiated state to a dark state are shown in FIGS. 4(a) and (b). The only difference between FIG. 4(a) and FIG. 4(b) is length of time.

As can be seen from FIGS. 4(a) and (b), even at 1800 seconds after transitioning to a dark state, the voltage decrease from the initial voltage is 200 mV or less, indicating that the photoelectric conversion element of Example 1 retains stable electrical storage performance for a long time.

Figure 5:
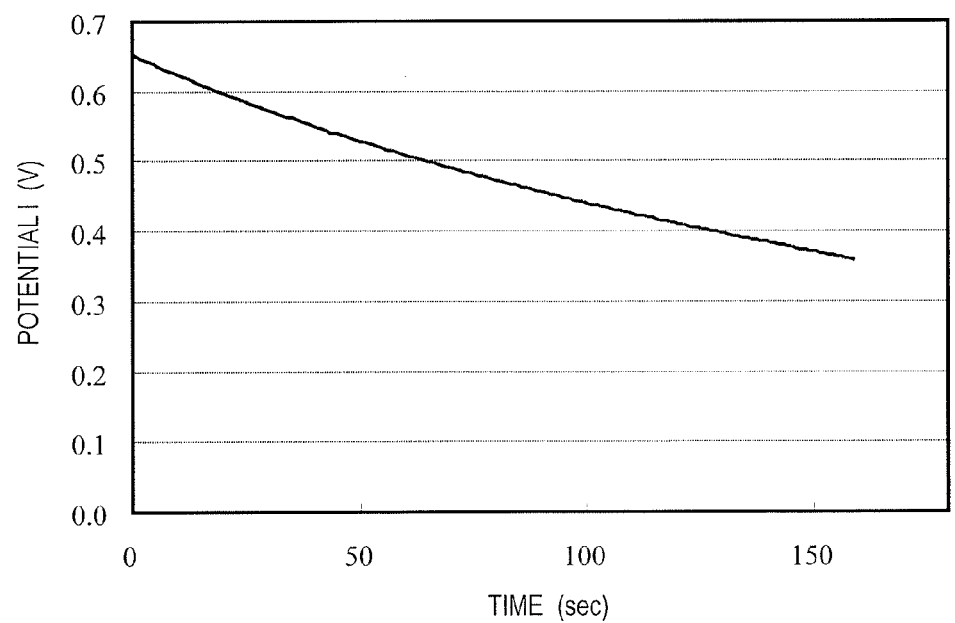
FIG. 5 A graph showing results of measuring voltage changes over time, when transitioning from a light-irradiated state to a dark state, with respect to a photoelectric conversion element of Example 2.

Similarly, regarding the photoelectric conversion element of Example 2, results of measuring voltage changes over time after transitioning from a light-irradiated state to a dark state are shown in FIG. 5. Moreover, the results of Example 1 and the results of Example 2 are together shown in FIG. 6.

Figure 6:
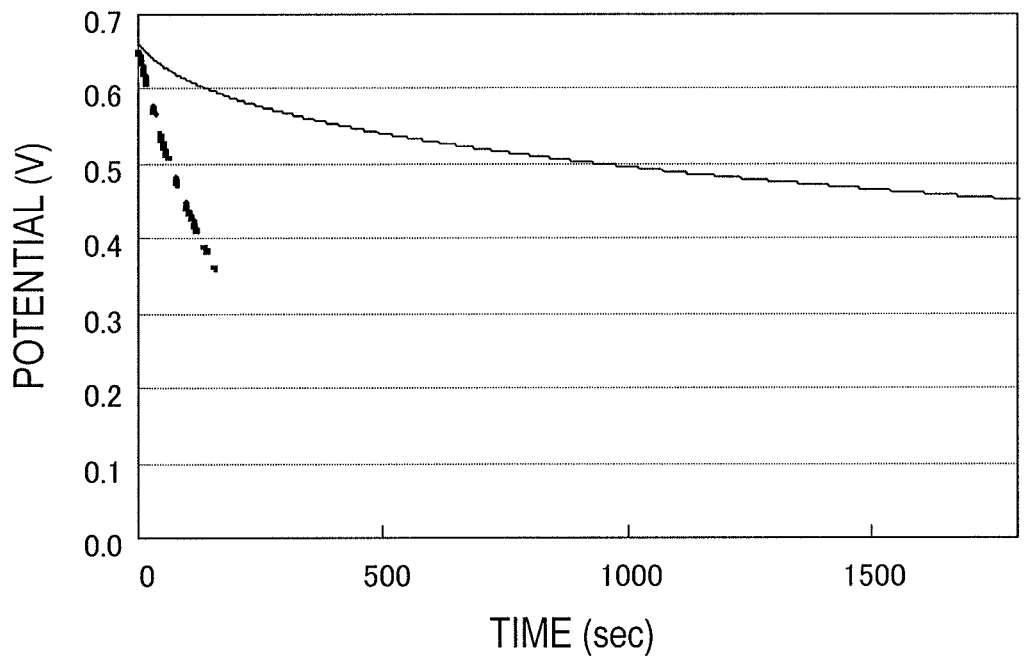
FIG. 6 A graph showing results of measuring voltage changes over time, when transitioning from a light-irradiated state to a dark state, with respect to photoelectric conversion elements of Examples 1 and 2.

As can be seen from FIG. 5 and FIG. 6, in the photoelectric conversion element of Example 2, the voltage decrease from the initial voltage is 200 mV or more at about 95 seconds after transitioning to a dark state. In other words, when an oxidation-reduction substance is dissolved in an electrolyte solution as in Example 2, stability of the electrical storage function decreases. Therefore, considering stability of the electrical storage function, it is preferable that the oxidation-reduction substance to be contained in the electrolyte solution is 10 mM at the most.

The photoelectric conversion element 100 according to an embodiment of the present disclosure can have a capacity of 0.01 mAh/cm² to 100 mAh/cm², for example. In applications where pulse discharge is needed (e.g., a wireless transmission power source for an indoor sensor), generally a discharge rate of 50 C or more is required. The photoelectric conversion elements of Examples 1 to 5 can be used for such applications.

The energy-storable dye-sensitized photovoltaic cell disclosed in Patent Document 2 is a photoelectric conversion element of a so-called beaker cell-type, which includes three electrodes (a photoelectrode, a counter electrode, and a charge storage electrode). While a beaker cell-type photoelectric conversion element allows even three or more electrode to be easily led outside, there is a difficulty in stably retaining the electrolyte solution for a long time. Another problem is the difficulty in downsizing the photoelectric conversion element, or its poor mass producibility. Not only in electrolyte solutions, but similar problems also exist in gel electrolytes containing electrolyte solutions.

Alternative embodiments of the present disclosure described below provide photoelectric conversion elements which have a novel structure capable of stably retaining the electrolyte medium, especially an electrolyte solution, for a long time. Moreover, the photoelectric conversion elements according to the alternative embodiments can have the advantages of the photoelectric conversion element according to the preceding embodiment.

Figure 7:
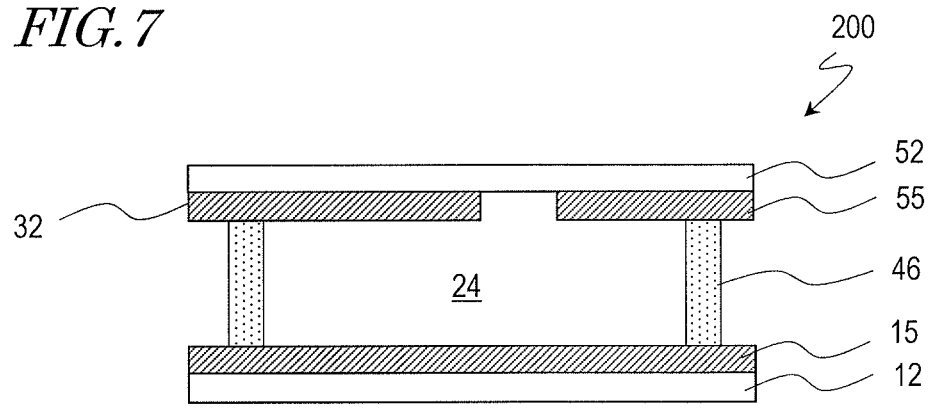
FIG. 7 A schematic cross-sectional view of a photoelectric conversion element 200 according to another embodiment of the present disclosure.

FIG. 7 shows a schematic cross-sectional view of a photoelectric conversion element 200 according to another embodiment of the present disclosure.

The photoelectric conversion element 200 includes: a first substrate 12; a second substrate 52 disposed so as to create an interspace between itself and the first substrate 12; an electrolyte medium 24 filling the interspace, the electrolyte medium 24 containing an electrolyte solution; a sealing portion 46 formed between the first substrate 12 and the second substrate 52, with which to hermetically contain the electrolyte medium 24 inside the interspace; and a first electrode 15, a second electrode 32, and a third electrode 55 in contact with the electrolyte medium 24 and each having an electrochemically distinct function. The first electrode 15 is formed on the first substrate 12, whereas the second electrode 32 and the third electrode 55 are formed on the second substrate 52. For example, the first electrode 15 is a photoanode, the second electrode 32 is a counter electrode, and the third electrode 55 is a charge storage electrode.

Positioning of the three electrodes is not limited to this example. As is exemplified by specific constructions below, at least a portion of each of two electrodes among the first electrode 15, the second electrode 32, and the third electrode 55 may be formed on the first substrate 12, while at least a portion of the other one of the first electrode 15, the second electrode 32, and the third electrode 55 may be formed on the second substrate 52. Furthermore, it suffices if at least a portion of each of the first electrode 15, the second electrode 32, and the third electrode 55 is formed on the first substrate 12 or the second substrate 52. For example, by using a sealing material having electrically conductive particles, the first electrode 15 formed on the first substrate 12 can be electrically connected to an electrode on the second substrate (which is insulated from another electrode on the second substrate). As such a sealing material, those which are commercially available as anisotropic electrically conductive materials (anisotropic conductive films (ACFs) or anisotropic conductive pastes (ACPs)) can be used. An anisotropic electrically conductive material is what is obtained by dispersing electrically conductive particles in an electrically insulative resin, and is electrically conductive only along the thickness direction. It will be appreciated that a sealing portion may be formed by using an electrically insulative sealing material, and, outside the sealing portion, the first electrode 15 formed on the first substrate 12 may be electrically connected to an electrode on the second substrate by using a copper wire or the like.

A photoelectric conversion element according to another embodiment of the present disclosure may of course include four or more electrodes; however, any electrode is to have a portion of the electrode formed upon the first substrate 12 or the second substrate 52. To say that "a portion of an electrode is formed on a substrate" does not require that the electrode be formed in its entirety on the substrate, but at least a portion of the electrode may be formed on the substrate, while other portions of the electrode may extend into the electrolyte medium 24. The portion of the electrode which is formed on the substrate may, for example, extend outside the sealing portion 46 as illustrated in FIG. 7, so as to be electrically connected to an external circuit.

Moreover, that a portion of an electrode "is formed on a substrate" means that a portion of the electrode is directly or indirectly in contact with the surface of the substrate, not via the electrolyte medium 24. For example, this encompasses not only forming directly on the surface of a glass substrate, but also forming on the surface of an insulative film (e.g., an inorganic insulative film such as a silicon dioxide film) which in turn is formed on the surface of a glass substrate.

The sealing portion 46 is formed by using a known sealing material (sealant). The sealing material is typically a resin or glass. As the resin, thermosetting resins, photocurable resins, or thermoplastic resins (thermally fusible resins) can be used. Sealing materials are electrically insulative in general. However, in the case where, as mentioned above, the first electrode 15 formed on the first substrate 12 is electrically connected to an electrode on the second substrate (which is insulated from another electrode), for example, an anisotropic electrically conductive material can be used.

As shown in FIG. 7, the sealing portion 46 is formed so as to be in contact with the first electrode 15, the second electrode 32, and the third electrode 55 formed on the first substrate 12 or the second substrate 52, thus allowing the electrolyte medium 24 to be securely sealed; therefore the electrolyte medium 24 has high preservation stability. For example, when a given electrode is led out to the exterior from its portion that is not formed on the substrate and in a manner of penetrating through the sealing portion, the interface at which the electrode and the sealing portion are in contact will increase in area, possibly allowing the electrolyte solution to leak from the interface. On the other hand, as is exemplified by the photoelectric conversion element 200 according to another embodiment of the present disclosure, with the construction where at least a portion of each of the three or more electrodes is formed on a substrate, such that they are led out to the exterior from its portion that is formed on the substrate, it is possible to effectively suppress or prevent leakage of the electrolyte solution. Note that an insulating layer covering the surface of each electrode (e.g., an inorganic insulative film such as a silicon dioxide film) may be provided, and the sealing portion may be formed so as to be in contact with that insulating layer.

Typically, the first substrate 12 and the second substrate 52 are insulator substrates. The shapes of the first substrate 12 and the second substrate 52 are typically plate-like, but are not particularly limited. Specifically, it is possible to use electrically insulative substrates, such as glass substrates, plastic substrates, or aluminum oxide substrates. Since a plurality of electrodes having electrochemically distinct functions are formed on the same substrate, it is preferable that the first substrate 12 and the second substrate 52 are electrically insulative at least on their surfaces. Although metal substrates or semiconductor substrates having insulative films formed on their surfaces may certainly be used, insulation substrates having light transmitting ability are used as necessary.

The three or more electrodes to be formed on the insulative surfaces of the first substrate 12 and the second substrate 52 are formed by using a known electrically conductive material. Plural electrodes which are formed on an insulative surface can be electrically insulated from one another by being formed so as to be separated from one another. Plural electrodes that are separated from one another can be formed by using a mask deposition technique, for example; or, an electrically conductive film which is formed on the entire surface may be separated into plural electrodes through etching by using a photolithography process or the like. Each electrode may be made of a metal layer, or an oxide conductive layer (transparent conductive layer), or a multilayer stack thereof. Materials and methods for forming electrodes are well known to those skilled in the art.

Next, with reference to FIG. 8 to FIG. 10, photoelectric conversion elements according to other embodiments of the present disclosure will be described. In the illustrated photoelectric conversion elements, the aforementioned first electrode is a photoanode, the aforementioned second electrode is a counter electrode, and the aforementioned third electrode is a charge storage electrode. Any component element having a substantially similar function to that of a component element of the photoelectric conversion element 100 according to the preceding embodiment may have its description omitted, while being denoted by a common reference numeral, for example.

Figure 8:
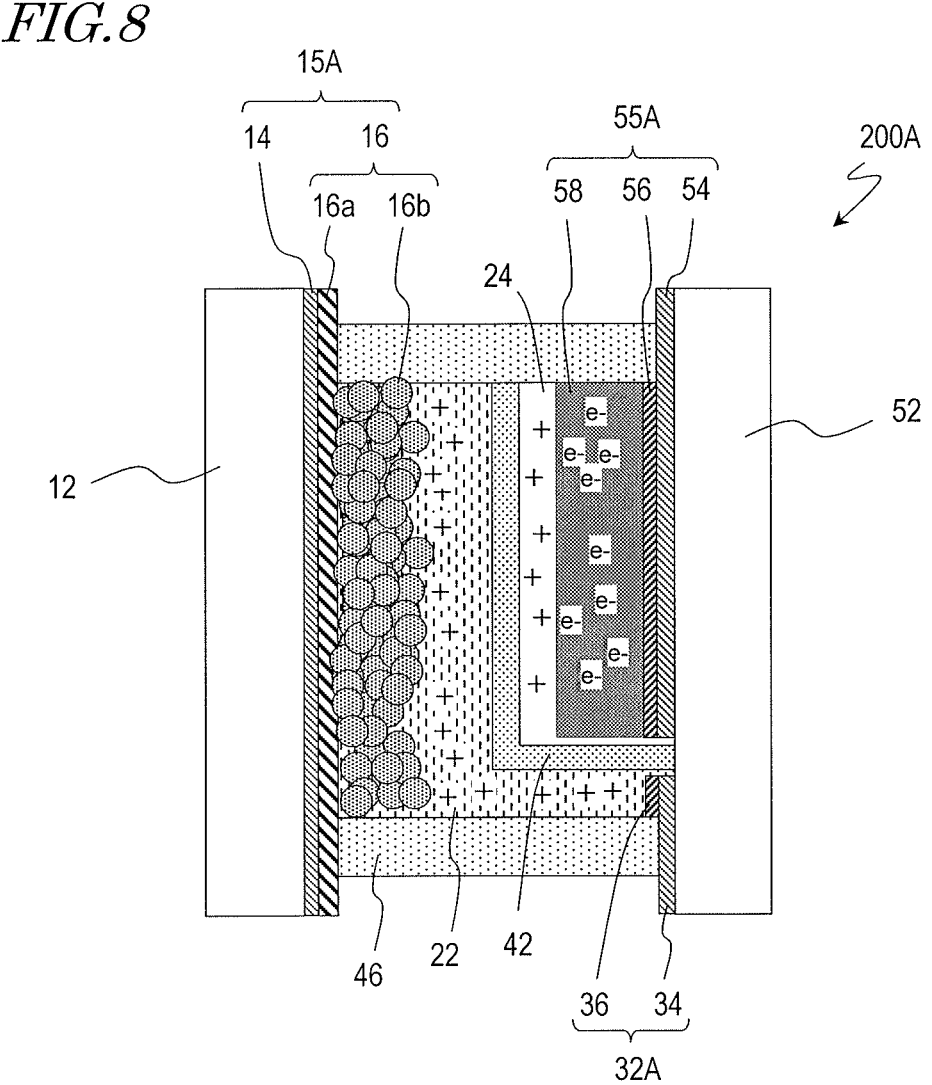
FIG. 8 A schematic cross-sectional view of a photoelectric conversion element 200A according to another embodiment of the present disclosure.

FIG. 8 shows a schematic cross-sectional view of a photoelectric conversion element 200A according to an embodiment.

The photoelectric conversion element 200A includes a photoanode 15A formed on a first substrate 12, a counter electrode 32A formed on a second substrate 52, a solid compound layer 22 disposed between the photoanode 15A and the counter electrode 32A, a charge storage electrode 55A formed on the second substrate 52 at a distance from the counter electrode 32A, and an electrolyte medium 24 which is contained in the solid compound layer 22 and which fills the interspace between the counter electrode 32A and the charge storage electrode 55A. The electrolyte medium 24 is typically an electrolyte solution, which hereinafter may be referred to as an electrolyte solution 24. In the interspace between the solid compound layer 22 and the charge storage electrode 55A, a separator 42 is provided for preventing them from being in direct contact with each other. Although the separator 42 may be omitted, it is preferably provided for the photoelectric conversion element 200A to be downsized and made thin. As the separator 42, for example, a porous plastic film or a nonwoven fabric of plastic may be used.

The photoelectric conversion element 200A constitutes a photoelectric generator between the photoanode 15A and the counter electrode 32A, and constitutes a storage cell between the counter electrode 32A and the charge storage electrode 55A. When the photoanode 15A includes a semiconductor layer 16*b* containing a photosensitizing agent, as is illustrated herein, a dye-sensitized photovoltaic cell is constituted between the photoanode 15A and the counter electrode 32A, for example.

In a charging state of the photoelectric conversion element 200A, the photoanode 15A and the charge storage electrode 55A are electrically connected via a switch SW (not shown), for example. On the other hand, in a discharging state, a load is connected to the counter electrode 32A and the charge storage electrode 55A. At this time, the photoanode 15A and the charge storage electrode 55A may be electrically isolated from each other, or alternatively, the photoanode 15A and the charge storage electrode 55A may always be kept electrically connected. Thus, photoelectric the conversion element 200A is basically capable of operating similarly to the photoelectric conversion element 100.

For example, the photoanode 15A includes a conductive layer 14 which transmits visible light, and a semiconductor layer 16 formed on the conductive layer 14. The semiconductor layer 16 includes a non-porous semiconductor layer 16a formed on the conductive layer 14 side and a porous semiconductor layer 16b formed on the non-porous semiconductor layer 16a, the porous semiconductor layer 16b containing a photosensitizing agent. The porous semiconductor layer 16b includes, for example, a porous semiconductor (e.g., porous titanium oxide) and a photosensitizing agent carried on the surface of the porous semiconductor. Although these other embodiments of the present disclosure are described herein as mainly concerning a photosensitizing agent which at least absorbs visible light, it will be appreciated that the photosensitizing agent may further absorb light in any other wavelength region (e.g., near-infrared).

Preferably, the semiconductor layer 16 is formed in such a manner that the conductive layer 14 is not in direct contact with the electrolyte solution 24. Since the porous semiconductor layer 16b composing the semiconductor layer 16 allows the electrolyte solution 24 to pass through, it is preferable that, as shown in FIG. 8, the surface of the conductive layer 14 facing the electrolyte solution 24 is completely covered with the non-porous semiconductor layer 16a.

When the conductive layer 14 is in direct contact with the electrolyte solution 24, a leakage current will occur if the oxidation-reduction potentials of the conductive layer 14 and the electrolyte solution 24 are different. By forming the semiconductor layer 16 in such a manner that the conductive layer 14 is not in direct contact with the electrolyte solution 24, a Schottky junction can be formed between the conductive layer 14 and the electrolyte solution 24, thus conferring rectification ability. This prevents leakage between the conductive layer 14 and the electrolyte solution 24. Moreover, by forming the conductive layer 14 so as to be covered by the non-porous semiconductor layer 16a, it becomes possible to prevent leakage between the conductive layer 14 and the electrolyte solution 24 with an increased certainty.

The solid compound layer 22 is typically structured so as to internally contain the electrolyte solution 24. The solid compound layer 22 is provided so as to be in direct contact with the photoanode 15A and the counter electrode 32A, for example. The solid compound layer 22 transports holes which are generated at the photoanode 15A to the counter electrode 32A. The solid compound layer 22 has the same construction as the solid compound layer 22 of the photoelectric conversion element 100 according to the preceding embodiment, and can be formed by using the same material and a similar method. The solid compound layer 22 functions as an oxidation-reduction substance, and also functions to immobilize or retain the oxidation-reduction substance. Therefore, by using the solid compound layer 22, it becomes possible to omit the cation exchange membrane described in Patent Document 2.

Note that the polymer gel layer has an advantage of being able to increase the contact area between the photoanode 15A and the counter electrode 32A. Preferably the polymer contains substantially no molecules with a molecular weight of less than 1000, for example. This restrains the low-molecular weight component having an oxidation-reduction site from eluting into the electrolyte solution 24 and being reduced at the charge storage electrode 55. Moreover, the polymer preferably has a cross-linked structure, where the cross-linked structure preferably has a chemical cross-linked structure. The reason is that a chemical cross-linked structure has a higher stability than does a physical cross-linked structure which is formed through entanglement of polymer chains. Preferably, the polymer gel layer further contains a conductivity aid. A polymer gel having a stable radical as an oxidation-reduction site is electrically conductive in an electrolyte solution; however, the internal resistance can be further decreased by mixing a conductivity aid (e.g., vapor-phase grown carbon fibers).

The counter electrode 32A, which functions as a positive electrode of the photoelectric conversion element, may be composed of a conductive layer 34 transmitting visible light and a metal layer 36 formed on the conductive layer 34, for example. The material of the transparent conductive layer 34 is e.g. fluorine-doped $SnO_2$, and the material of the metal layer 36 is e.g. platinum.

The electrolyte solution 24 contains a supporting electrolyte and a solvent. The electrolyte solution 24 preferably contains no oxidation-reduction substance, and the oxidation-reduction substance to be contained in the electrolyte solution 24 is 10 mM at the most, for example. Transport of holes preferably only occurs in the solid compound layer 22. The electrolyte solution 24 is in contact with the photoanode 15A, the counter electrode 32A, and the charge storage electrode 55A. The electrolyte solution 24 is hermetically contained between the first substrate 12 and the second substrate 52 by the sealing portion 46.

For example, the charge storage electrode 55A includes an oxide conductive layer 54 formed on the substrate 52, a metal layer 56 formed on the oxide conductive layer 54, and a charge storage layer 58 formed on the metal layer 56. The charge storage layer 58 may be formed from a mixture of tungsten oxide and electrically conductive carbon, for example. The charge storage layer 58 is in contact with the electrolyte solution 24. The substrate 52 is, for example, a glass substrate or a plastic substrate (including a plastic film) which transmits visible light.

Next, other photoelectric conversion elements 200B and 200C which are electrochemically equivalent to the photoelectric conversion element 200A will be described.

Figure 9:
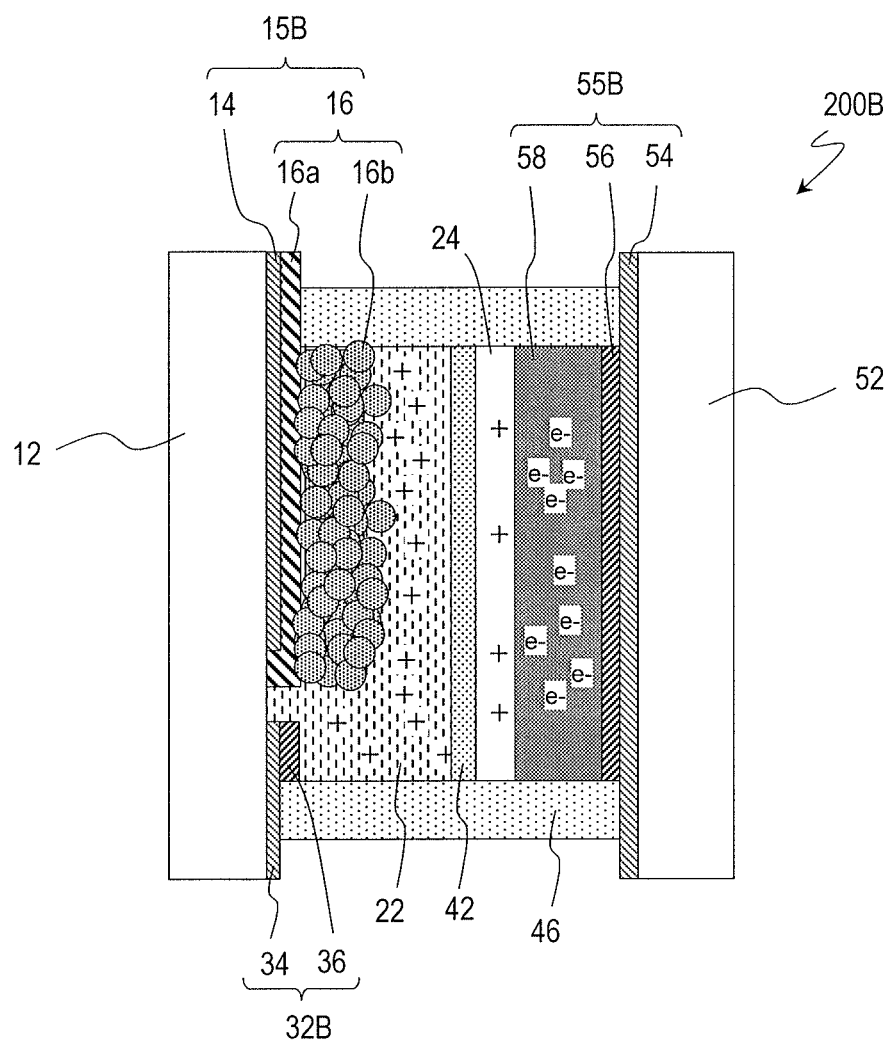
FIG. 9 A schematic cross-sectional view of another photoelectric conversion element 200B according to another embodiment of the present disclosure.

FIG. 9 is a schematic cross-sectional view of the photoelectric conversion element 200B. In the photoelectric conversion element 200B, a photoanode 15B and a counter electrode 32B are formed on the substrate 12, and a charge storage electrode 55B is formed on the substrate 52.

As mentioned earlier, it is preferable that the semiconductor layer 16 is formed in such a manner that the conductive layer 14 is not in direct contact with the electrolyte solution 24. In the case where there is a possibility that the edge of the conductive layer 14 may come in direct contact with the electrolyte solution 24 (i.e., the edge of the conductive layer 14 existing in the space which is surrounded by the sealing portion 46) as in the photoelectric conversion element 200B, it is preferable that there is a region on the substrate 12 where no conductive layer 14 exists but only the semiconductor layer 16 exists when viewed from the normal direction of the substrate 12, as shown in FIG. 9. Since the porous semiconductor layer 16b composing the semiconductor layer 16 allows the electrolyte solution 24 to pass through, it is preferable that, when viewed from the normal direction of the substrate 12, there is a region on the substrate 12 where no conductive layer 14 exits but only the non-porous semiconductor layer 16a exists. In other words, it is preferable to cover not only the surface of the conductive layer 14 but also the side faces of the edge with the non-porous semiconductor layer 16a.

Figure 10:
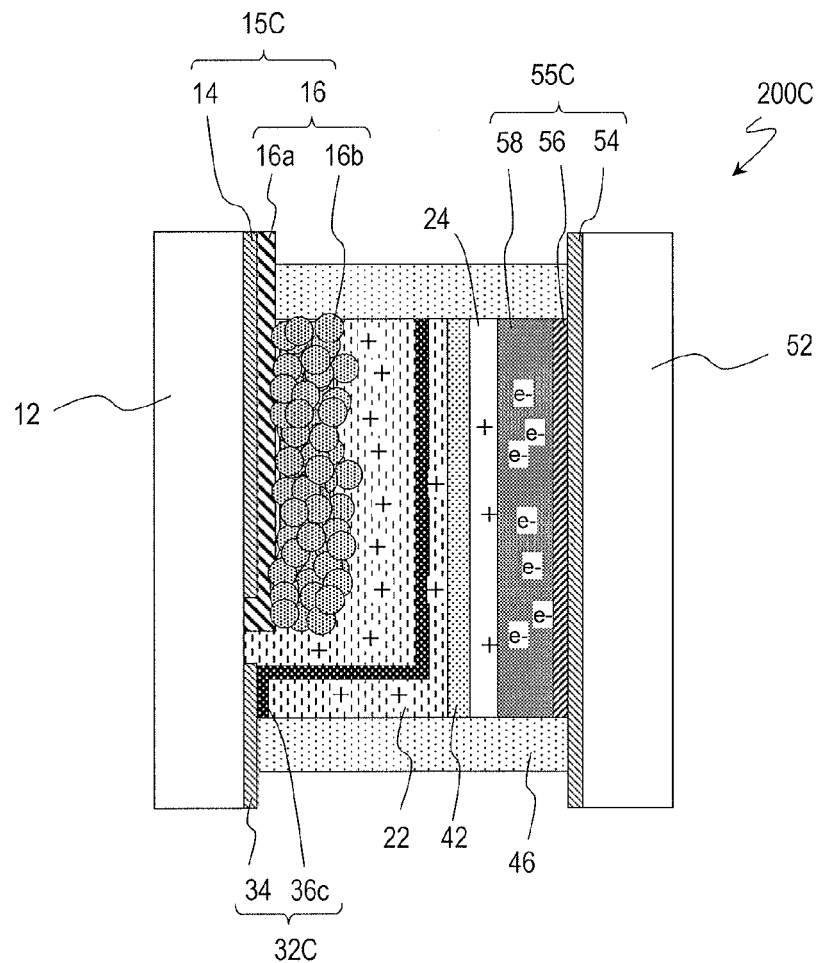
FIG. 10 A schematic cross-sectional view of another photoelectric conversion element 200C according to another embodiment of the present disclosure.

FIG. 10 shows a schematic cross-sectional view of the photoelectric conversion element 200C. In the photoelectric conversion element 200C, portions of a photoanode 15C and a counter electrode 32C are formed on the substrate 12, and a charge storage electrode 55C is formed on the substrate 52. In the photoelectric conversion element 200C, the distances from the photoanode 15C and charge storage electrode 55C to the counter electrode 32C can be made smaller than the distances from the photoanode 15B and charge storage electrode 55B to the counter electrode 32B in the photoelectric conversion element 200B, and therefore the internal resistance of the photoelectric conversion element 200C can be made smaller than the internal resistance of the photoelectric conversion element 200B. Note that the counter electrode 32C of the photoelectric conversion element 200C differs from the counter electrode 32B of the photoelectric conversion element 200B in that it includes throughholes through which the electrolyte solution 24 can pass.

Moreover, in the photoelectric conversion element 200C, too, it is preferable that the semiconductor layer 16 is formed in such a manner that the conductive layer 14 is not in direct contact with the electrolyte solution 24, and it is preferable that there is a region on the substrate 12 where no conductive layer 14 exits but only the non-porous semiconductor layer 16a exists.

Hereinafter, the materials to be used for forming the aforementioned component elements of the photoelectric conversion elements 200A, 200B, and 200C will be described in detail. Although the following description will take the component elements of the photoelectric conversion element 200A as an example, they will also be used for forming the component elements of the photoelectric conversion elements 200B and 200C, unless otherwise specified.

<Photoanode>

As described above, for example, the photoanode 15A includes the conductive layer 14 transmitting visible light, and the semiconductor layer 16 formed on the conductive layer 14, the semiconductor layer 16 containing a photosensitizing agent. The semiconductor layer 16 containing a photosensitizing agent may also be referred to as a light absorbing layer. In this case, for example, the substrate 12 is a glass substrate or a plastic substrate (including a plastic film) which transmits visible light. The photoanode 15A has the same construction as the photoanode 15 of the photoelectric conversion element 100 according to the preceding embodiment, and can be formed by using the same material and a similar method.

In order to prevent electron leakage at the surface of the conductive layer 14, i.e., in order to confer rectification ability between the conductive layer 14 and the semiconductor layer 16, an oxide layer such as silicon oxide, tin oxide, titanium oxide, zirconium oxide, or aluminum oxide may be formed between the conductive layer 14 and the semiconductor layer 16.

As mentioned earlier, the semiconductor layer 16 preferably includes a non-porous semiconductor layer 16a formed on the conductive layer 14 side and a porous semiconductor layer 16b formed on the non-porous semiconductor layer 16a, the porous semiconductor layer 16b containing a photosensitizing agent. The porous semiconductor layer 16b containing a photosensitizing agent includes a porous semiconductor and a photosensitizing agent carried on the surface of the porous semiconductor, where the porous semiconductor is porous titanium oxide ($TiO_2$), for example. Titanium oxide is characterized by it high photoelectric conversion characteristics and by the fact that photodissolution into the electrolyte solution is unlikely to occur. Moreover, porous bodies have a large specific surface area, thereby providing the advantage of being able to carry a large amount of photosensitizing agent and increase the contact area between the subsequently-described solid compound layer 22 and the electrolyte solution 24. Without being limited to porous bodies, a semiconductor layer 16 may be composed of aggregated semiconductor particles, for example. Note that the non-porous semiconductor layer 16a is a non-porous titanium oxide layer, for example. The thickness of the non-porous semiconductor layer 16a is not less than 1 nm and not more than 100 nm, for example. If the thickness of the non-porous semiconductor layer 16a is less than 1 nm, occurrence of leakage current may not be sufficiently suppressed; if it is more than 100 nm, the electrical resistance may be large, possibly lowering the photocurrent.

<Counter Electrode>

The counter electrode 32A, which functions as a positive electrode of the photoelectric conversion element, receives holes from the subsequently-described solid compound layer 22 and supplies electrons to the solid compound layer 22. Examples of the material composing the counter electrode 32A include: metals such as platinum, gold, silver, copper, aluminum, rhodium, and indium; carbon materials such as graphite, carbon nanotubes, and carbon on which platinum is carried; electrically-conductive metal oxides such as indium-tin complex oxide, tin oxide doped with antimony, and tin oxide doped with fluorine; and electrically conductive polymers such as polyethylene dioxythiophene, polypyrrole, and polyaniline. Among these, platinum, graphite, polyethylene dioxythiophene, and the like are preferable.

As shown in FIG. 8 to FIG. 10, the counter electrode 32A may be composed of a conductive layer 34 which transmits visible light, and a metal layer 36c formed on the conductive layer 34.

Moreover, as is illustrated in FIG. 10, in a construction where the counter electrode 32C is disposed between the photoanode 15C and the charge storage electrode 55C, the metal layer 36c of the counter electrode 32C includes throughholes through which the electrolyte solution can pass. Examples of the metal layer 36c of such a counter electrode 32C include a mesh electrode, a grid electrode, a separator with a conductive layer formed thereon, and a porous body of electrically conductive material. As the mesh electrode, commercially-available general-purpose platinum meshes can be used, for example. A separator with a conductive layer formed thereon can be produced by depositing gold, platinum, or the like on a separator, by a sputtering technique or a vapor deposition technique, for example.

<Electrolyte Medium>

The electrolyte medium 24 is typically an electrolyte solution 24. The electrolyte solution 24 contains a supporting electrolyte (supporting electrolyte) and a solvent. The electrolyte medium 24 may be the same as the electrolyte medium 24 of the photoelectric conversion element 100 according to the preceding embodiment.

<Solid Compound Layer>

As mentioned earlier, the solid compound layer 22 is typically structured so as to internally contain the electrolyte solution 24. The solid compound layer 22 may be the same as the solid compound layer 22 of the photoelectric conversion element 100 according to the preceding embodiment.

<Charge Storage Electrode>

As mentioned earlier, the charge storage electrode 55A includes, for example, an oxide conductive layer 54, a metal layer 56 formed on the oxide conductive layer 54, and a charge storage layer 58 formed on the metal layer 56. The charge storage electrode 55A may be the same as the charge storage electrode 55 of the photoelectric conversion element 100 according to the preceding embodiment.

Note that photoelectric conversion elements according to still other embodiments of the present disclosure include a photocathode, for example, instead of the photoanodes 15A, 15B, and 15C of the above-described photoelectric conversion elements 200A to 200C. Such photoelectric conversion elements also have an electrical storage function. As the photocathode, for example, nickel oxide with a sensitizer carried thereon can be used.

EXAMPLES

Hereinafter, the other embodiments of the present disclosure will be specifically described by way of Examples. Photoelectric conversion elements according to Examples 6 and 7 and Comparative Example 4 were produced, and their characteristics were evaluated.

Example 6

A photoelectric conversion element having substantially the same structure as that of the photoelectric conversion element 200A shown in FIG. 8 was produced. The respective component elements were as follows.

substrate 12: glass substrate thickness 1 mm
transparent conductive layer 14: fluorine-doped $SnO_2$ layer (surface resistance 10Ω/□)
non-porous semiconductor layer 16a: titanium oxide layer thickness 10 nm
porous semiconductor layer 16b: porous titanium oxide, photosensitizing dye (D131, manufactured by Mitsubishi Chemical Corporation)
solid compound layer 22: mixture of poly((2,2,6,6-tetramethylpiperidine-1-oxyl-oxyl-4-yl)-glycidyl ether) and vapor-phase grown carbon fibers (denoted as "C" in Table 1) (mass ratio 2:1)
electrolyte solution 24: electrolyte solution obtained by dissolving N-methylbenzimidazole at 0.025 mol/l and lithium perchlorate at 0.1 mol/l in acetonitrile
substrate 52: glass substrate thickness 1 mm
oxide conductive layers 34 and 54: fluorine-doped $SnO_2$ layer (surface resistance 10Ω/□)
metal layers 36 and 56: platinum layer
charge storage layer 58: material obtained by mixing tungsten oxide ($WO_3$) and vapor-phase grown carbon fibers at a mass ratio of 5:1

The photoelectric conversion element of Example 6 was produced as follows.

Two electrically conductive glass substrates (manufactured by Asahi Glass, Co., Ltd.) with a thickness of 1 mm, having a fluorine-doped $SnO_2$ layer, were provided. These were used as a substrate 12 having a transparent conductive layer 14 and a substrate 52 having oxide conductive layers 34 and 54.

High-purity titanium oxide powder with an average primary particle size of 20 nm was dispersed in ethyl cellulose, thus producing a paste for screen printing.

After forming a titanium oxide layer 16a with a thickness of about 10 nm on the fluorine-doped $SnO_2$ layer 14 of one of the electrically conductive glass substrates by sputtering technique, the aforementioned paste was applied thereon and dried, and the resultant dry matter was baked in the air at 500° C. for 30 minutes, thereby forming a porous titanium oxide layer (titanium coating) with a thickness of 2 μm.

Next, the substrate having the porous titanium oxide layer formed thereon was immersed in an acetonitrile-butanol 1:1 mixed solvent solution containing the photosensitizing dye (D131 (manufactured by Mitsubishi Paper Mills Limited)) as shown in [Formula 13] at a concentration of 0.3 mM, and left still in a dark place at room temperature for 16 hours, thus allowing the photosensitizing agent to be carried on the porous titanium oxide layer (porous semiconductor layer 16b). Thus, a photoanode 15A was formed.

Platinum was deposited by sputtering technique on the surface of the other glass substrate, which had been masked, thereby forming metal layers 36 and 56.

0.5 g of tungsten oxide (WO3: manufactured by WAKO) and 0.1 g of VGCF (a vapor-phase grown carbon fibers manufactured by Showa Denko K.K.; a registered trademark) were placed in a mortar, and agitated and mixed for 10 minutes. After mixing, 1 ml of NMP (n-methylpyrrolidone) and 0.1 mg of PVDF (polyvinylidene fluoride) were added, followed by further agitation for 10 minutes, whereby a slurried suspension was obtained.

After the mask was removed, the above slurry was applied on the metal layer 56 to a thickness of 10 μm by the blade method, thereby forming a charge storage layer 58. Thus, a charge storage electrode 55A was obtained.

Similarly to Example 1, the solid compound layer 22 was formed by using a polymer as shown in [Formula 30].

Next, a separator 42 was placed on the solid compound layer 22. At this time, the separator 42 was placed so as that the solid compound 22 was partially exposed. As the separator 42, Celgard 2400" (manufactured by Polypore International Inc.) was used.

Next, in a manner of surrounding the portion of the photoanode 15A in which the porous titanium oxide layer 16b had been formed, a sealing material of hot-melt adhesive ("Bynel" manufactured by Dupont-Mitsui Polychemicals Co., Ltd) was applied onto the glass substrate 52 having the two electrodes 32A and 55A, whereupon the glass substrate 12 having the photoanode 15A formed thereon was placed, and they were attached together with pressurization while being heated. At this time, pressurization was performed along the thickness direction, thus to allow the portion of the solid compound 22 which was exposed outside the separator 42 to come in contact with the counter electrode 32A. The separator 42 existed in between the solid compound 22 and the charge storage layer 58, so that contact between the solid compound 22 and the charge storage layer 58 was prevented by the separator 42.

Next, in a manner of surrounding the portion of the photoanode 15A in which the porous titanium oxide layer 16b had been formed, a sealing material of hot-melt adhesive ("Bynel" manufactured by Dupont-Mitsui Polychemicals Co., Ltd) was placed on the glass substrate 52 having the two electrodes 32A and 55A, whereupon the glass substrate 12 having the photoanode 15A formed thereon was placed, and they were attached together with pressurization while being heated. The glass substrate 52 having the charge storage electrode 55A formed thereon had been apertured with a diamond drill.

Next, an electrolyte solution was prepared by dissolving 0.025 mol/l of N-methylbenzimidazole and 0.1 mol/l of lithium perchlorate into acetonitrile. This electrolyte solution 24 was injected through the aforementioned aperture, thus obtaining the photoelectric conversion element of Example 6. The aperture was closed with a pore sealing material (curable resin).

Example 7

A photoelectric conversion element having substantially the same structure as that of the photoelectric conversion element 200B shown in FIG. 9 was produced.

In the method for producing the photoelectric conversion element 200A according to Example 6, the transparent conductive layer 14 was patterned during fabrication of the substrate having the photoanode 15A, thereby forming transparent conductive layers 14 and 34. By allowing the platinum mesh electrode 36 to adhere to the transparent conductive layer 34 with an electrically conductive adhesive, a counter electrode 32B was formed.

On the other hand, a platinum layer 56 was deposited on the glass substrate 52 having the transparent conductive layer 54, and a charge storage layer 58 was formed on the platinum layer 56, thereby obtaining a charge storage electrode 55B.

By using these two substrates, a photoelectric conversion element according to Example 7 was formed similarly to Example 6.

Comparative Example 4

Similarly to the method for producing the photoelectric conversion element 200A of Example 6, a substrate 12 having a photoanode 15A and a substrate 52 having a counter electrode 32A and a charge storage electrode 55A were produced, and placed in a beaker.

Next, an electrolyte solution was prepared by dissolving 0.025 mol/l of N-methylbenzimidazole and 0.1 mol/l of lithium perchlorate into acetonitrile, which was poured into a beaker, thereby producing a beaker cell which was electrochemically equivalent to the photoelectric conversion element 200A of Example 6.

Figure 11:
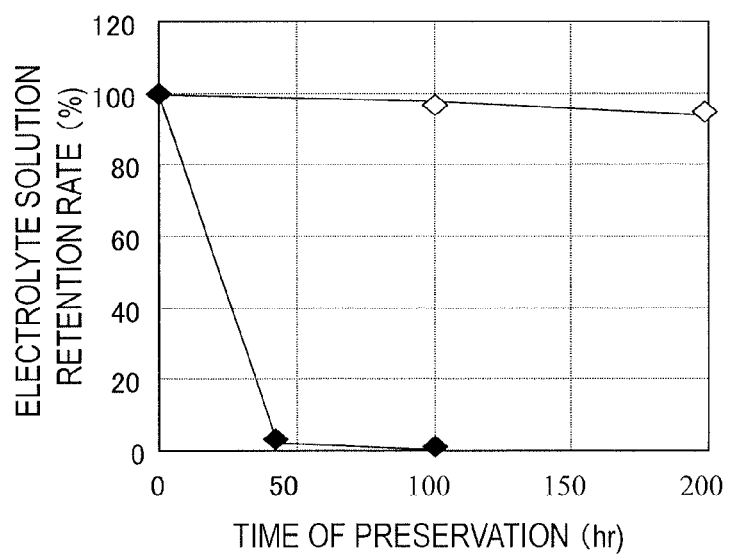
FIG. 11 A graph showing an electrolyte solution retention rate of photoelectric conversion elements of Example 6 and Comparative Example 4.

FIG. 11 shows results of evaluating a retention rate (%) of the electrolyte solution, where the photoelectric conversion elements of Example 6 and Comparative Example 4 described above were preserved in the atmospheric air at room temperature. In FIG. 11, ◇ indicates results of Example 6, whereas ◆ indicates results of Comparative Example 4.

As can be seen from FIG. 11, even after being preserved at room temperature in the atmospheric air for 200 hours, the photoelectric conversion element of Example 6 showed an electrolyte solution retention rate of 90% more, whereby good preservation stability was confirmed. On the other hand, in the photoelectric conversion element of Comparative Example 4, the electrolyte solution easily vaporized, decreasing to near 0% in several dozen hours; this was far from stable.

Thus, according to other embodiments of the present disclosure, because of the aforementioned structural features, the preservation stability of an electrolyte medium in a photoelectric conversion element having three or more electrodes with electrochemically distinct functions can be improved.

INDUSTRIAL APPLICABILITY

According to the present disclosure, for example, an electrical storage function is conferred to a dye-sensitized electric generator which is capable of generating electric power even in environments with relatively low illuminance, e.g., indoors, thus making it possible to perform discharge at a rate which is higher than conventional. According to the present disclosure, it is furthermore possible to improve the preservation stability of the electrolyte medium of an photoelectric conversion element.

REFERENCE SIGNS LIST 12 substrate
14 transparent conductive layer
15, 15A photoanode
16 semiconductor layer containing photosensitizing agent
22 solid compound layer
24 electrolyte medium (electrolyte solution)
32, 32A, 32B, 32C counter electrode
42 separator
52 substrate
54 oxide conductive layer
55, 55A charge storage electrode
56 metal layer
58 charge storage layer
100, 200A, 200B, 200C photoelectric conversion element

The invention claimed is:

1. A photoelectric conversion element comprising:
   a photoanode;
   a counter electrode;
   a solid compound layer disposed between the photoanode and the counter electrode;
   a charge storage electrode disposed at an interspace from the counter electrode; and
   an electrolyte medium being contained in the solid compound layer and filling the interspace.

2. The photoelectric conversion element of claim 1, wherein the electrolyte medium is an electrolyte solution, and an oxidation-reduction substance contained in the electrolyte solution is 10 mM at the most.

3. The photoelectric conversion element of claim 1, wherein the solid compound layer is in direct contact with the photoanode and the counter electrode.

4. The photoelectric conversion element of claim 1, wherein the solid compound layer includes a polymer gel layer containing a polymer having an oxidation-reduction site.

5. The photoelectric conversion element of claim 4, wherein the polymer contains substantially no molecules with a molecular weight of less than 1000.

6. The photoelectric conversion element of claim 4, wherein the polymer has a cross-linked structure.

7. The photoelectric conversion element of claim 4, wherein the polymer gel layer further contains a conductivity aid.

8. The photoelectric conversion element of claim 4, wherein the oxidation-reduction site includes a stable radical.

9. The photoelectric conversion element of claim 1, wherein the photoanode further includes a conductive layer which transmits visible light and a semiconductor layer formed on the conductive layer, the semiconductor layer containing a photosensitizing agent.

10. The photoelectric conversion element of claim 9, wherein the semiconductor layer contains porous titanium oxide.

* * * * *